United States Patent
Nakano

(10) Patent No.: US 11,070,305 B2
(45) Date of Patent: Jul. 20, 2021

(54) OPTICAL RELAY, OPTICAL RELAY CONTROL METHOD, AND OPTICAL TRANSMISSION SYSTEM

(71) Applicant: NEC Corporation, Tokyo (JP)

(72) Inventor: Takehiro Nakano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/611,274

(22) PCT Filed: May 9, 2018

(86) PCT No.: PCT/JP2018/017971
§ 371 (c)(1),
(2) Date: Nov. 6, 2019

(87) PCT Pub. No.: WO2018/207835
PCT Pub. Date: Nov. 15, 2018

(65) Prior Publication Data
US 2020/0067622 A1   Feb. 27, 2020

(30) Foreign Application Priority Data
May 11, 2017   (JP) .............................. JP2017-094506

(51) Int. Cl.
*H04J 14/02* (2006.01)
*H01S 3/00* (2006.01)
*H01S 3/067* (2006.01)

(52) U.S. Cl.
CPC ............ *H04J 14/02* (2013.01); *H01S 3/0064* (2013.01); *H01S 3/0677* (2013.01); *H01S 3/06766* (2013.01)

(58) Field of Classification Search
CPC ...... H04J 14/02; H01S 3/0064; H01S 3/0677; H01S 3/06766
See application file for complete search history.

(56) References Cited

U.S. PATENT DOCUMENTS

2002/0167722 A1   11/2002   Willner et al.
2003/0206334 A1*  11/2003   Hwang ............... H01S 3/06754
                                                              359/341.5
(Continued)

FOREIGN PATENT DOCUMENTS

JP    2000-312185 A    11/2000
JP    2001-156364 A     6/2001
(Continued)

OTHER PUBLICATIONS

International Search Report for PCT Application No. PCT/JP2018/017971, dated Jul. 17, 2018.
(Continued)

*Primary Examiner* — Dzung D Tran

(57) ABSTRACT

The optical relay is a C+L-band relay which is inserted between a first transmission path fiber and a second transmission path fiber, and comprises: a first optical fiber amplification unit which is inserted in a first line and amplifies one of a C-band signal or an L-band signal; a second optical fiber amplification unit which is inserted in a second line and amplifies one of the C-band signal or the L-band signal; and an inserting means which inserts some or all of the wavelengths of light output from the first optical fiber amplification unit into the second optical fiber amplification unit, or which inserts some or all of the wavelengths of light output from the second optical fiber amplification unit into the first optical fiber amplification unit.

20 Claims, 12 Drawing Sheets

(56) References Cited

U.S. PATENT DOCUMENTS

| | | | | |
|---|---|---|---|---|
| 2004/0004756 A1* | 1/2004 | Hainberger | ......... | H01S 3/06758 359/341.3 |
| 2004/0240045 A1* | 12/2004 | Lee | ................... | H01S 3/094003 359/349 |
| 2008/0123181 A1* | 5/2008 | Wysocki | .............. | H04B 10/294 359/337.1 |
| 2009/0034974 A1* | 2/2009 | Grubb | ................. | H04J 14/0204 398/68 |

FOREIGN PATENT DOCUMENTS

| | | | |
|---|---|---|---|
| JP | 2003-283021 A | 10/2003 |
| JP | 2004-518333 A | 6/2004 |
| JP | 2004-343121 A | 12/2004 |

OTHER PUBLICATIONS

English translation of Written opinion for PCT Application No. PCT/JP2018/017971.
Extended European Search Report for EP Application No. EP18798413.3 dated Jun. 18, 2020.
Japanese Office Action for JP Application No. 2019-517670 dated Dec. 22, 2020 with English Translation.

\* cited by examiner

OPTICAL RELAY, OPTICAL RELAY CONTROL METHOD, AND OPTICAL TRANSMISSION SYSTEM This application is a National Stage Entry of PCT/JP2018/017971 filed on May 9, 2018, which claims priority from Japanese Patent Application 2017-094506 filed on May 11, 2017, the contents of all of which are incorporated herein by reference, in their entirety.

TECHNICAL FIELD

The present invention relates to an optical relay, a control method of an optical relay, and an optical transmission system, and more specifically, to an optical relay, a control method of an optical relay, and an optical transmission system suitably used for a wavelength division multiplexing (WDM) communication system.

BACKGROUND ART

An optical transmission system of the WDM communication method transmits a multi-wavelength optical signal by using one optical fiber and thereby can improve transmission efficiency. Expansion of a transmission bandwidth in a WDM communication system is required due to an increased data amount, and a broadband transmission system using a conventional band (C-band) and a long band (L-band) at the same time is used. In general, the C-band has a bandwidth from 1525 nm to 1570 nm and the L-band has a bandwidth from 1570 nm to 1610 nm. In the broadband transmission system using the C-band and the L-band at the same time, a C+L-band relay is used. In the C+L-band relay, a method of performing optical amplification by using an erbium-doped fiber (EDF) is widely diffused.

Patent Literature 1 (PTL1) relates to an erbium-doped optical fiber amplifier and proposes that, in order to improve a gain, a C-band of amplified spontaneous emission (ASE) generated during an amplification process by an optical fiber amplification unit is re-entered into the optical fiber amplification unit.

CITATION LIST

Patent Literature

[PTL1] Japanese Patent Application Laid-Open No. 2003-283021

SUMMARY OF INVENTION

Technical Problem

In an optical transmission system including a large number of relays as in a submarine cable system, a long-term operation of 25 years or more from an initial installation stage is required, and an important issue is to overcome an accumulated amount of a large amount of loss due to cable repairing, and a gain tilt and a gain deviation resulting therefrom.

An object of the present invention is to provide an optical relay, a control method of an optical relay, and an optical transmission system, being capable of correcting or controlling a gain tilt and a gain deviation of an optical fiber amplification unit.

Solution to Problem

To achieve the above-mentioned object, an optical relay according to the present invention is a C+L-band relay inserted between a first transmission path fiber and a second transmission path fiber, and comprises:

a first optical fiber amplification unit that is inserted in a first line and amplifies either a C-band signal or an L-band signal;

a second optical fiber amplification unit that is inserted in a second line and amplifies either a C-band signal or an L-band signal; and an inserting means that inserts light of some or all wavelengths output from the first optical fiber amplification unit into the second optical fiber amplification unit or inserts light of some or all wavelengths output from the second optical fiber amplification unit into the first optical fiber amplification unit.

A control method of an optical relay according to the present invention that is a control method of a C+L-band relay inserted between a first transmission path fiber and a second transmission path fiber, wherein an optical relay includes a first optical fiber amplification unit that is inserted in a first line and amplifies either a C-band signal or an L-band signal and a second optical fiber amplification unit that is inserted in a second line and amplifies either a C-band signal or an L-band signal, the method comprises:

inserting light of some or all wavelengths output from the first optical fiber amplification unit into the second optical fiber amplification unit or inserting light of some or all wavelengths output from the second optical fiber amplification unit into the first optical fiber amplification unit.

Advantageous Effects of Invention

The present invention is able to correct or control a gain tilt and a gain deviation of an optical fiber amplification unit of an optical relay.

EXAMPLE EMBODIMENT

A preferred example embodiment of the present invention is described in detail with reference to the accompanying drawings. Before specific example embodiments are described, an optical relay according to an example embodiment of a generic concept of the present invention is described.

Figure 9:
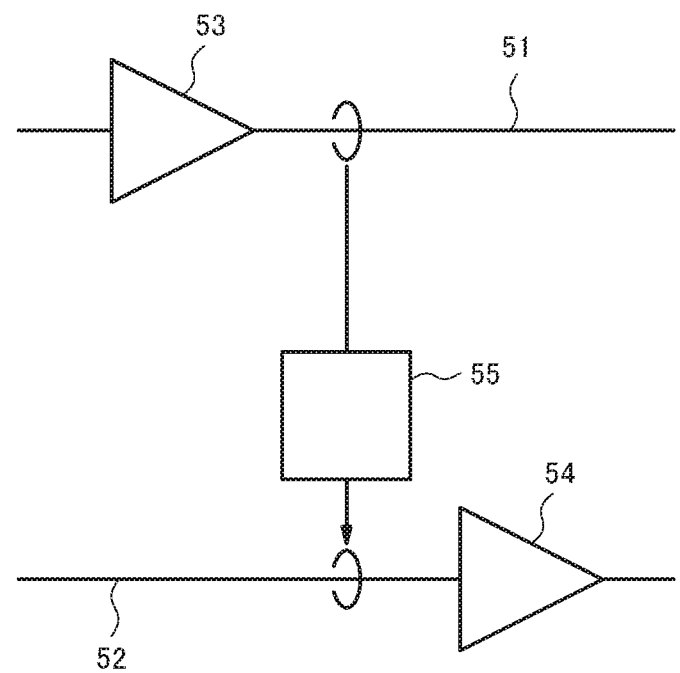
FIG. 9 is a block diagram illustrating an optical relay according to an example embodiment based on a generic concept of the present invention.

FIG. 9 is a block diagram illustrating an optical relay according to an example embodiment based on a generic concept of the present invention. The optical relay in FIG. 9 is a C+L-band relay inserted between a first transmission path fiber and a second transmission path fiber, which are not illustrated. The optical relay in FIG. 9 includes a first optical fiber amplification unit 53 that is inserted in a first line 51 and amplifies either a C-band signal or an L-band signal. The first optical fiber amplification unit 53 is a C-band-dedicated amplifier or an L-band-dedicated amplifier. Further, the optical relay in FIG. 9 includes a second optical fiber amplification unit 54 that is inserted in a second line 52 and amplifies either a C-band signal or an L-band signal. The second optical fiber amplification unit 54 is a C-band-dedicated amplifier or an L-band-dedicated amplifier.

Further, the optical relay in FIG. 9 includes an inserting means 55 that inserts light of some or all wavelengths output from the first optical fiber amplification unit 53 into the second optical fiber amplification unit 54, or inserts light of some or all wavelengths output from the second optical fiber amplification unit 54 into the first optical fiber amplification unit 53.

The inserting means 55 inserts, as dummy light, light of some or all wavelengths output from the first optical fiber amplification unit 53 into the second optical fiber amplification unit 54. Alternatively, the inserting means 55 inserts, as dummy light, light of some or all wavelengths output from the second optical fiber amplification unit 54 into the first optical fiber amplification unit 53.

When, for example, light of C-band wavelengths close to an L-band is input to an optical fiber amplification unit amplifying an L-band, the optical fiber amplification unit amplifying an L-band amplifies optical power of L-band shortwave-side wavelengths in a reduced state.

Further, when light of L-band wavelengths close to a C-band is input to an optical fiber amplification unit amplifying a C-band, the optical fiber amplification unit amplifying a C-band amplifies optical power of a C-band long-wave-side wavelength in an extended state.

Thereby, a gain tilt and a gain deviation occur in an optical fiber amplification unit amplifying an L-band and an optical fiber amplification unit amplifying a C-band included in a C+L-band relay can be corrected. Hereinafter, specific example embodiments are described in more detail with reference to drawings.

According to specific example embodiments described below, description is made, assuming that as an optical amplification medium amplifying an optical signal, an optical amplification medium doped with a fluorescent material of a rare-earth element is used and as one example thereof, a rare-earth-doped optical fiber amplifier is used. Further, according to the specific example embodiments, description is made, assuming that as one example of a rare-earth-doped optical fiber amplifier, an erbium-doped fiber amplifier is used. Hereinafter, an erbium-doped fiber amplifier is abbreviated as an EDFA.

First Example Embodiment

Figure 1:
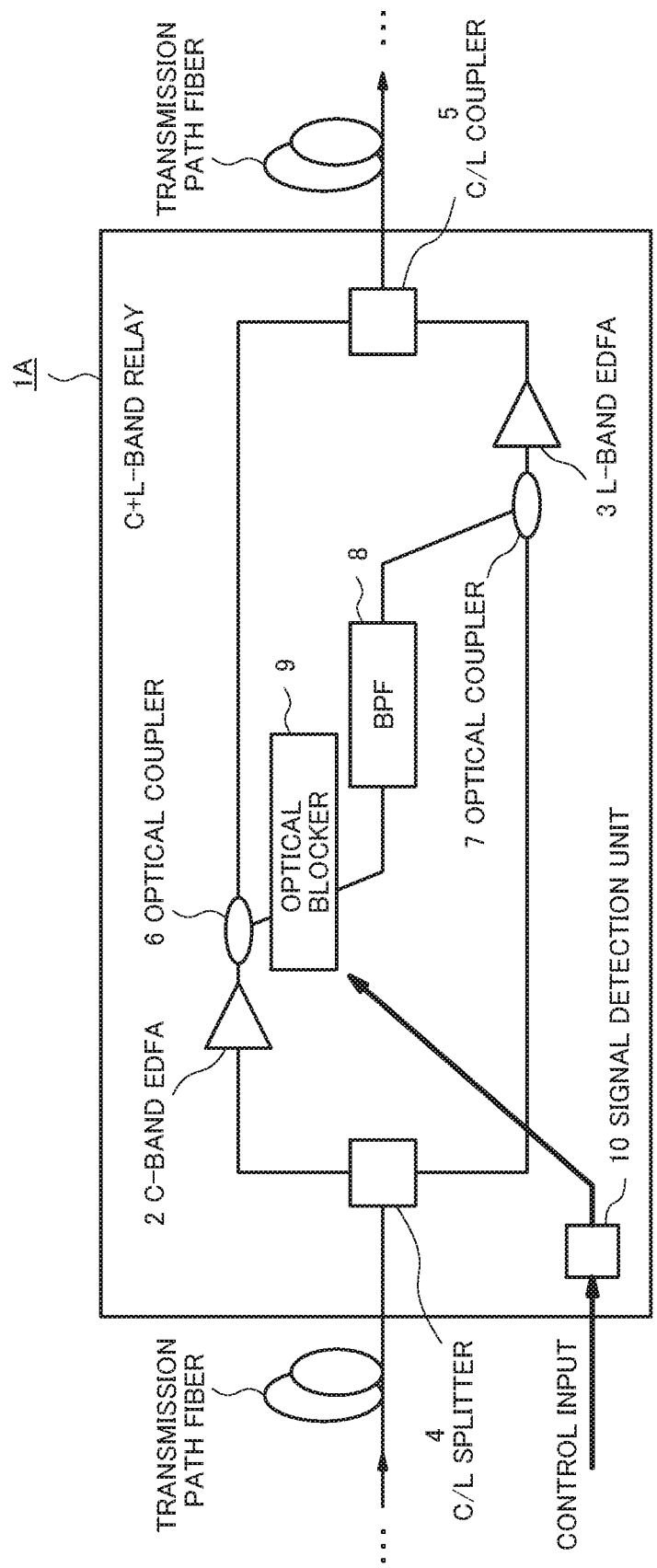
FIG. 1 is a block diagram illustrating an optical transmission system including a C+L-band relay according to a first example embodiment of the present invention.

First, an optical relay, a control method of an optical relay, and an optical transmission system according to a first example embodiment of the present invention are described. FIG. 1 is a block diagram illustrating an optical transmission system including a C+L-band relay according to the first example embodiment of the present invention.

(Description of a Configuration)

In the optical transmission system in FIG. 1, a C+L-band relay 1A is inserted in a transmission path fiber. It is assumed that in a signal input from the transmission path fiber to the C+L-band relay 1A, WDM signals of both a C-band and an L-band are multiplexed.

The C+L-band relay 1A in FIG. 1 includes a C/L splitter 4, a C-band EDFA 2 as one example of a first optical fiber amplification unit, an L-band EDFA 3 as one example of a second optical fiber amplification unit, a C/L coupler 5, and a signal detection unit 10.

The C/L splitter 4 performs wavelength separation and separates an input WDM signal into a C-band/an L-band. The C-band EDFA 2 amplifies a main signal of a C-band. The L-band EDFA 3 amplifies a main signal of an L-band. The C/L coupler 5 performs wavelength multiplexing for a C-band signal amplified in the C-band EDFA 2 and an L-band signal amplified in the L-band EDFA 3. The signal detection unit 10 outputs a control signal in response to control input from an outside.

Further, the C+L-band relay 1A in FIG. 1 includes an optical blocker 9, a bandpass filter 8 (BPF 8), an optical coupler 6, and an optical coupler 7, as one example of an inserting means that inserts light of some or all wavelengths output from the C-band EDFA 2 into the L-band EDFA 3.

The optical coupler 6 performs intensity branching for light output by the C-band EDFA 2. The optical blocker 9 transmits or blocks a C-band signal from the optical coupler 6 in accordance with an input control signal. According to the present example embodiment, a control signal to the optical blocker 9 is output by the signal detection unit 10 that receives control input from an outside. The bandpass filter 8 (BPF 8) transmits a part of light of C-band wavelengths being an output signal of the optical blocker 9. The optical coupler 7 multiplexes light of C-band wavelengths being an output signal of the BPF 8 with input of the L-band EDFA 3. In the C+L-band relay 1A in FIG. 1, a disposition order of the optical blocker 9 and the BPF 8 may be reversed.

(Description of an Operation)

An operation of the C+L-band relay 1A in FIG. 1 is described. It is assumed that in an optical signal input from a transmission path fiber to the C+L-band relay 1A, WDM signals of both a C-band and an L-band are multiplexed.

An input C+L-band signal is subjected to wavelength branching into respective bands in the C/L splitter 4. A C-band signal branched in the C/L splitter 4 is optically amplified in the C-band EDFA 2 and is subjected to intensity branching in the optical coupler 6, and one of the branched signals is input to the C/L coupler 5. An L-band signal branched in the C/L splitter 4 is transmitted through the optical coupler 7, is amplified in the L-band EDFA 3, and is input to the C/L coupler 5. The C/L coupler 5 multiplexes amplified light of C-band wavelengths and amplified light of L-band wavelengths and outputs the multiplexed light to a transmission path fiber.

There is a path for inputting output light of the C-band EDFA 2 to the L-band EDFA 3 between the optical coupler 6 and the optical coupler 7 according to the present example embodiment, and the optical blocker 9 and the BPF 8 are disposed in the path. In a normal state, the optical blocker 9 is blocked and transmits a C-band signal through an L-band path only when there is control input from the signal detection unit 10.

Figure 2A:
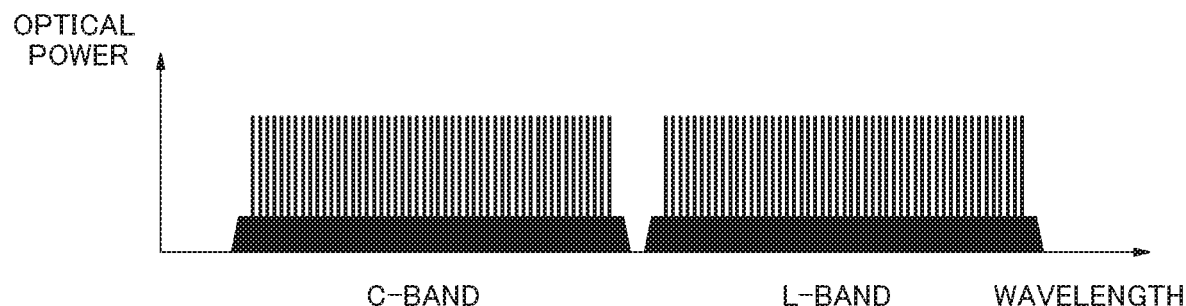
FIG. 2A is a graph illustrating a relation between a wavelength and optical power of signal light transmitted in a C+L-band transmission system, in a normal state.
Figure 2B:
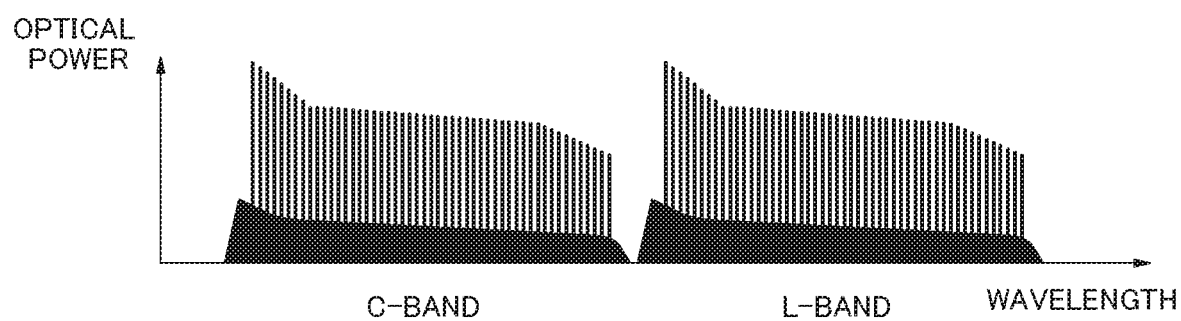
FIG. 2B is a graph illustrating a relation between a wavelength and optical power of signal light transmitted in a C+L-band transmission system, in a long-term operation state.

FIG. 2A is a graph illustrating a relation between a wavelength and optical power of signal light transmitted in a C+L-band transmission system, in a normal state. FIG. 2B is a graph illustrating a relation between a wavelength and optical power of signal light transmitted in a C+L-band transmission system, in a long-term operation state. Usually, in signal light transmitted in a C+L-band transmission system, optical levels of each wavelengths are in a fixed state as in FIG. 2A. However, when the transmission system is operated for a long-term and losses due to repairing and the like of a transmission path fiber are accumulated in the entire transmission system, a gain tilt of a shortwave rise occurs in both a C-band and an L-band, as illustrated in FIG. 2B. In particular, a deviation of a shortwave-side wavelength in both bands is large, and with an increase in channel power, signal quality is likely to degrade due to a non-linear optical effect.

In general, a gain of an EDFA has wavelength dependency, and therefore a shortwave side or a longwave side rises, depending on a gain. In an initial stage of installation of a transmission system and a relay, an EDFA is adjusted to a gain in which a band is flat (FIG. 2A), but when a loss in a transmission path increases due to the above-described situation, a gain of an EDFA increases in such a way as to compensate for the loss. A gain of an EDFA increases in such a way as to compensate for the loss, and therefore a band is shifted from a gain achieving flatness, and has a gain tilt as in FIG. 2B.

In the C+L-band relay 1A in FIG. 1, when a gain tilt or a gain deviation as described above occurs, the signal detection unit 10 releases the optical blocker 9, based on control input from an outside and causes light to be transmitted through an L-band path leading to input of the L-band EDFA 3. In the BPF 8, light of some of wavelengths, i.e. only light of wavelengths close to an L-band according to the present example embodiment is extracted from the light transmitted through the optical blocker 9 as in FIG. 2C, and the extracted light is multiplexed with input of the L-band EDFA 3 in the optical coupler 7. In this case, C-band wavelengths close to an L-band are input to the L-band EDFA 3 and thereby, as in FIG. 2C, optical power of L-band shortwave-side wavelengths is amplified in a reduced state.

(Description of an Advantageous Effect)

In the C+L-band relay 1A according to the present example embodiment, only light of wavelengths close to an L-band of output light of the C-band EDFA 2 is multiplexed with input of the L-band EDFA 3 in the optical coupler 7 through a path for inputting output light of the C-band EDFA 2 to the L-band EDFA 3. Thereby, the L-band EDFA 3 amplifies an optical signal while optical power of L-band shortwave-side wavelengths is reduced. Channel power of an L-band shortwave-side of the L-band EDFA 3 is reduced, and thereby signal quality degradation and an optical signal to noise ratio (OSNR) deviation due to a non-linear optical effect of an L-band to be transmitted can be reduced.

It is assumed that the C/L coupler 5 usually has characteristics that block light of a wavelength different from a wavelength input from an input port of each of a C-band and an L-band. It is assumed that the C/L coupler 5 has characteristics that, for example, light of L-band wavelengths is blocked with respect to an optical signal input from an input port of a C-band of the C/L coupler 5 and light of C-band wavelengths is blocked with respect to an optical signal input from an input port of an L-band of the coupler. Thereby, C-band wavelengths input to the L-band EDFA 3 for adjusting a gain deviation and a gain tilt are blocked in the C/L coupler 5, and there is an advantage that crosstalk degradation due to re-coupling of light of C-band wavelengths is reduced. Further, a branched path is designed in such a way that light of C-band wavelengths enters the L-band EDFA 3 from an output end of the C-band EDFA 2, and therefore from a viewpoint of level balancing, there is also an advantage in that a loss in a main path of the optical coupler 6 of a C-side path can be reduced.

Figure 2C:
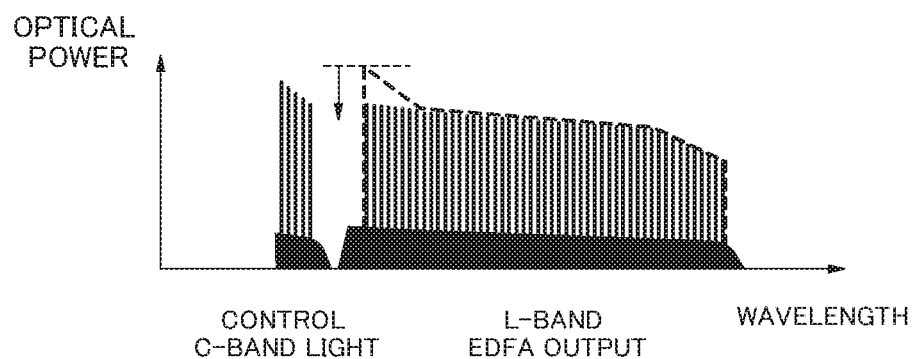
FIG. 2C is a graph illustrating an advantageous effect according to an example embodiment of the present invention and illustrating a relation between a wavelength and optical power of signal light transmitted in a C+L-band transmission system.

It has been described that according to the example embodiment described above, only light of wavelengths close to an L-band of output light of the C-band EDFA 2 is multiplexed with input of the L-band EDFA 3 in the optical coupler 7 as illustrated in FIG. 2C, and the L-band EDFA 3 amplifies an optical signal while optical power of L-band shortwave-side wavelengths is reduced, but correction or control of a gain tilt and a gain deviation according to the example embodiment of the present invention is not limited thereto. According to the example embodiment, while a wavelength band included in a C-band and close to an L-band contributes to correction of a gain deviation, a configuration may be made in such a way that the entire wavelength bandwidth of C-band is inserted in the L-band EDFA 3.

Further, an increase/decrease in output power or an optical signal to noise ratio (OSNR) of the entire bandwidth of an L-band of an L-band EDFA is controlled by an optical intensity, a wavelength range, or a combination thereof inserted as control C-band light, and thereby main signal quality may be balanced between C- and L-bands or the like.

Figure 2D:
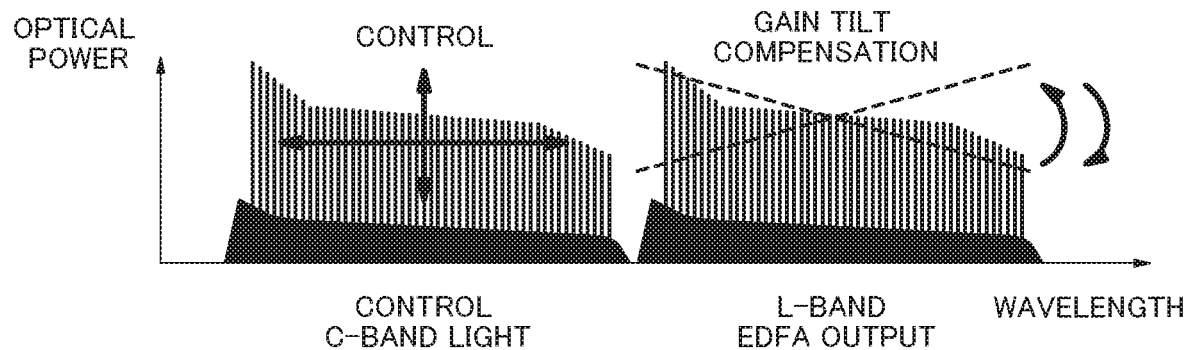
FIG. 2D is a graph illustrating an advantageous effect according to the example embodiment of the present invention and illustrating a relation between a wavelength and optical power of signal light transmitted in a C+L-band transmission system.

The BPF 8 may transmit not only light of wavelengths close to an L-band of output light of the C-band EDFA 2 but also light of wavelengths of a wide range through which the entire C-band is transmitted. An operation of controlling a gain tilt of light of L-band wavelengths as in FIG. 2D may be applied by setting a band width, a wavelength disposition position, and a level of light of the transmitted C-band wavelengths. A gain tilt of output of the L-band EDFA 3 can be compensated for, for example, with an increase/decrease in a wavelength range and an increase/decrease in optical power of light output from the C-band EDFA 2 and multiplexed with input of the L-band EDFA 3. A gain tilt of output of an L-band EDFA can be compensated for as indicated by an arrow in FIG. 2D, by controlling control C-band light indicated by an arrow in FIG. 2D. Further, when the entire C-band is used as correction light in order to correct a gain tilt and a gain deviation of output of the L-band EDFA 3, a configuration may be made in such a way that the BPF 3 is unnecessary.

Second Example Embodiment

Figure 3:
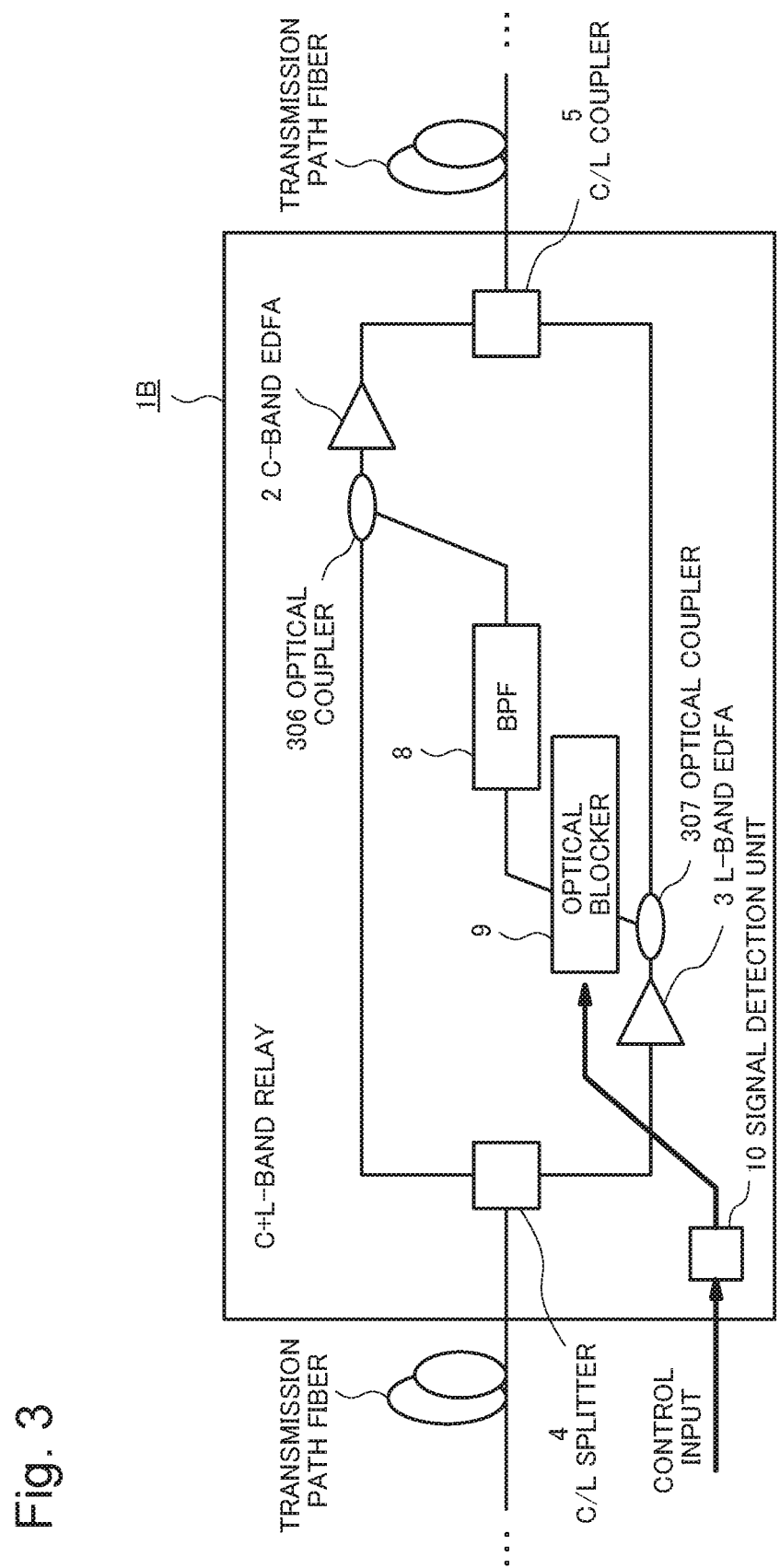
FIG. 3 is a block diagram illustrating an optical transmission system including a C+L-band relay according to a second example embodiment of the present invention.

Next, an optical relay, a control method of an optical relay, and an optical transmission system according to a second example embodiment of the present invention are described. FIG. 3 is a block diagram illustrating an optical transmission system including a C+L-band relay according to the second example embodiment of the present invention. According to the present example embodiment, conversely to the first example embodiment, output light of an L-band EDFA 3 is multiplexed with input of a C-band EDFA 2 through a path for inputting output light of the L-band EDFA 3 to the C-band EDFA 2. An element similar to a corresponding element of the first example embodiment is assigned with the same reference number, and thereby detailed description is omitted.

(Description of a Configuration)

In an optical transmission system in FIG. 3, a C+L-band relay 1B is inserted in a transmission path fiber. Similarly to the first example embodiment, it is assumed that in a signal input from the transmission path fiber to the C+L-band relay 1B, WDM signals of both a C-band and an L-band are multiplexed.

The C+L-band relay 1B in FIG. 3 includes, similarly to the first example embodiment, a C/L splitter 4, a C-band EDFA 2 as one example of a first optical fiber amplification unit, an L-band EDFA 3 as one example of a second optical fiber amplification unit, a C/L coupler 5, and a signal detection unit 10.

Further, the C+L-band relay 1B in FIG. 3 includes an optical blocker 9, a bandpass filter 8 (BPF 8), an optical coupler 306, and an optical coupler 307, as one example of an inserting means that inserts light of some or all wavelengths output from the L-band EDFA 3 into the C-band EDFA 2.

The optical coupler 307 performs intensity branching for light output by the L-band EDFA 3. The optical blocker 9 transmits or blocks an L-band signal from the optical coupler 307 in response to an input control signal. According to the present example embodiment, similarly to the first example embodiment, a control signal to the optical blocker 9 is output by the signal detection unit 10 that receives control input from an outside. The bandpass filter 8 (BPF 8) transmits a part of light of L-band wavelengths of an output signal of the optical blocker 9. The optical coupler 306 multiplexes light of L-band wavelengths of an output signal of the BPF 8 with input of the C-band EDFA 2. In the C+L-band relay 1B in FIG. 3, a disposition order of the optical blocker 9 and the BPF 8 may be reversed.

(Description of an Operation)

An operation of the C+L-band relay 1B in FIG. 3 is described. It is assumed that in an optical signal input from a transmission path fiber to the C+L-band relay 1B, WDM signals of both a C-band and an L-band are multiplexed.

An input C+L-band signal is subjected to wavelength branching into respective bands in the C/L splitter 4. An L-band signal branched in the C/L splitter 4 is optically amplified in the L-band EDFA 3 and is subjected to intensity branching in the optical coupler 307, and one of the branched signals is input to the C/L coupler 5. A C-band signal branched in the C/L splitter 4 is transmitted through the optical coupler 306, is amplified in the C-band EDFA 2, and is input to the C/L coupler 5. The C/L coupler 5 multiplexes amplified light of C-band wavelengths and amplified light of L-band wavelengths and outputs the multiplexed light to a transmission path fiber.

There is a path for inputting output light of the L-band EDFA 3 to the C-band EDFA 2 between the optical coupler 307 and the optical coupler 306 according to the present example embodiment, and the optical blocker 9 and the BPF 8 are disposed in the path. In a normal state, the optical blocker 9 is blocked and transmits an L-band signal through a C-band path only when there is control input from the signal detection unit 10.

In the C+L-band relay 1B in FIG. 3, when a gain tilt or a gain deviation as illustrated in FIG. 2B occurs, the signal detection unit 10 releases the optical blocker 9, based on control input from an outside and causes light to be transmitted through a C-band path leading to input of the C-band EDFA 2. In the BPF 8, only light of some of wavelengths is extracted from the light transmitted through the optical blocker 9, and the extracted light is multiplexed with input of the C-band EDFA 2 in the optical coupler 306.

(Description of an Advantageous Effect)

In the C+L-band relay 1B according to the present example embodiment, output light of the L-band EDFA 3 is multiplexed with input of the C-band EDFA 2 in the optical coupler 306 through a path for inputting output light of the L-band EDFA 3 to the C-band EDFA 2. Thereby, channel power of the C-band EDFA 2 is reduced, and thereby signal quality degradation and an OSNR deviation due to a nonlinear optical effect of a C-band to be transmitted can be reduced.

As described according to the first example embodiment, the C/L coupler 5 usually has characteristics that block light of a wavelength different from a wavelength input from an input port of each of a C-band and an L-band. Thereby, there is an advantage according to the present example embodiment that light of L-band wavelengths input to the C-band EDFA 2 for adjusting a gain deviation and a gain tilt is blocked by the C/L coupler 5 and crosstalk degradation due to re-coupling of light of L-band wavelengths is reduced. Further, a branched path is designed in such a way that light of L-band wavelengths enters the C-band EDFA 2 from an output end of the L-band EDFA 3, and therefore from a viewpoint of level balancing, there is also an advantage in that a loss in a main path of the optical coupler 6 of an L-side path can be reduced.

According to the first example embodiment, it has been described that an output of a C-band is branched, a branched output is entered into the L-band EDFA 3 and controlled, and a gain tilt and a gain deviation of light of L-band wavelengths are controlled, and according to the second example embodiment, it has been described that an output of an L-band is branched, a branched output is entered into the C-band EDFA 2 and controlled, and a gain tilt and a gain deviation of light of C-band wavelengths are controlled. However, by combining the C+L-band relay 1A in FIG. 1 and the C+L-band relay 1B in FIG. 3, a configuration that corrects or controls a gain tilt and a gain deviation with respect to both a C-band and an L-band can be made. Also, according to example embodiments described later, a configuration that corrects only a one-side wavelength band and a configuration that corrects both wavelength bands can be achieved.

Third Example Embodiment

Figure 4A:
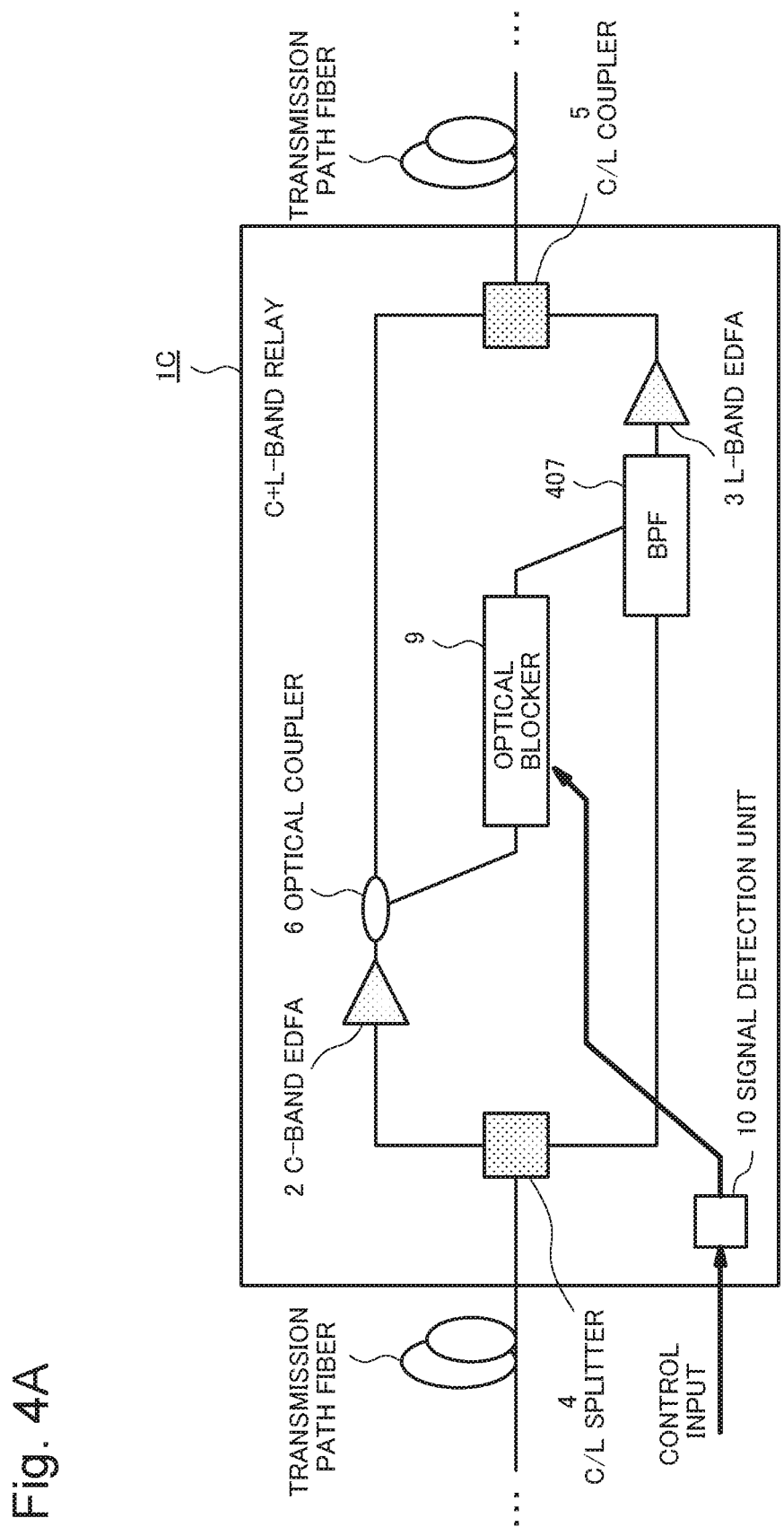
FIG. 4A is a block diagram illustrating an optical transmission system including a C+L-band relay according to a third example embodiment of the present invention.

Next, an optical relay, a control method of an optical relay, and an optical transmission system according to a third example embodiment of the present invention are described. FIG. 4A is a block diagram illustrating an optical transmission system including a C+L-band relay according to the third example embodiment of the present invention. The present example embodiment is a modified example of the C+L-band relay 1A in FIG. 1. An element similar to a corresponding element of the first example embodiment is assigned with the same reference number, and thereby detailed description is omitted.

(Description of a Configuration)

In an optical transmission system in FIG. 4A, a C+L-band relay 1C is inserted in a transmission path fiber. It is assumed that in a signal input from the transmission path fiber to the C+L-band relay 1C, WDM signals of both a C-band and an L-band are multiplexed.

The C+L-band relay 1C in FIG. 4A includes, similarly to the first example embodiment, a C/L splitter 4, a C-band EDFA 2 as one example of a first optical fiber amplification unit, an L-band EDFA 3 as one example of a second optical fiber amplification unit, a C/L coupler 5, and a signal detection unit 10.

Further, the C+L-band relay 1C in FIG. 4A includes an optical blocker 9, a bandpass filter 407 (BPF 407), and an optical coupler 6, as one example of an inserting means that inserts light of some or all wavelengths output from the C-band EDFA 2 into the L-band EDFA 3. In other words, the C+L-band relay 1C in FIG. 4A includes the bandpass filter 407 (BPF 407) instead of the BPF 8 and the optical coupler 7 in FIG. 1.

The BPF 407 according to the present example embodiment includes a function of preforming wavelength multiplexing for light of C-band wavelengths from the optical blocker 9 and light of L-band wavelengths of an L-band main path from the C/L splitter 4. By using the BPF 407 including such a function, a loss in an L-band main path can be reduced, relative to the optical coupler 7 in FIG. 1. Further, both a C-band wavelength selection function and a multiplexing function are included in the BPF 407, and therefore the number of components can be reduced.

(Description of an Operation)

An operation of the C+L-band relay 1C in FIG. 4A is described. It is assumed that in an optical signal input from a transmission path fiber to the C+L-band relay 1C, WDM signals of both a C-band and an L-band are multiplexed.

An input C+L-band signal is subjected to wavelength branching into respective bands in the C/L splitter 4. A C-band signal branched in the C/L splitter 4 is optically amplified in the C-band EDFA 2 and is subjected to intensity branching in the optical coupler 6, and one of the branched signals is input to the C/L coupler 5. An L-band signal branched in the C/L splitter 4 is subjected to wavelength multiplexing in the BPF 407, is amplified in the L-band EDFA 3, and is input to the C/L coupler 5. The C/L coupler 5 multiplexes amplified light of C-band wavelengths and amplified light of L-band wavelengths and outputs the multiplexed light to a transmission path fiber.

There is a path for inputting output light of the C-band EDFA 2 to the L-band EDFA 3 between the optical coupler 6 and the BPF 407 according to the present example embodiment, and the optical blocker 9 and the BPF 407 are disposed in the path. In a normal state, the optical blocker 9 is blocked and transmits a C-band signal through an L-band path only when there is control input from the signal detection unit 10.

In the C+L-band relay 1C in FIG. 4A, when a gain tilt or a gain deviation as described above occurs, the signal detection unit 10 releases the optical blocker 9, based on control input from an outside and causes light to be transmitted through an L-band path leading to input of the L-band EDFA 3. In the BPF 407, light of some of wavelengths, i.e. only light of wavelengths close to an L-band according to the present example embodiment is extracted from the light transmitted through the optical blocker 9 and the extracted light is multiplexed with input of the L-band EDFA 3.

(Description of an Advantageous Effect)

In the C+L-band relay 1C according to the present example embodiment, only light of wavelengths close to an L-band of output light of the C-band EDFA 2 is multiplexed with input of the L-band EDFA 3 in the BPF 407 through a path for inputting output light of the C-band EDFA 2 to the L-band EDFA 3. Thereby, the L-band EDFA 3 amplifies an optical signal while optical power of L-band shortwave-side wavelengths is reduced. Channel power of an L-band shortwave side of the L-band EDFA 3 is reduced, and thereby signal quality degradation and an OSNR deviation due to a non-linear optical effect of an L-band to be transmitted can be reduced.

Further, according to the present example embodiment, the BPF 407 that performs wavelength multiplexing for light of C-band wavelengths from the optical blocker 9 and light of L-band wavelengths of an L-band main path from the C/L splitter 4 is used. Thereby, in the C+L-band relay 1C according to the present example embodiment, a loss in an L-band main path can be reduced, relative to the optical coupler 7 in FIG. 1. Further, both a C-band wavelength selection function and a multiplexing function are included in the BPF 407, and therefore the number of components can be reduced.

Fourth Example Embodiment

Figure 4B:
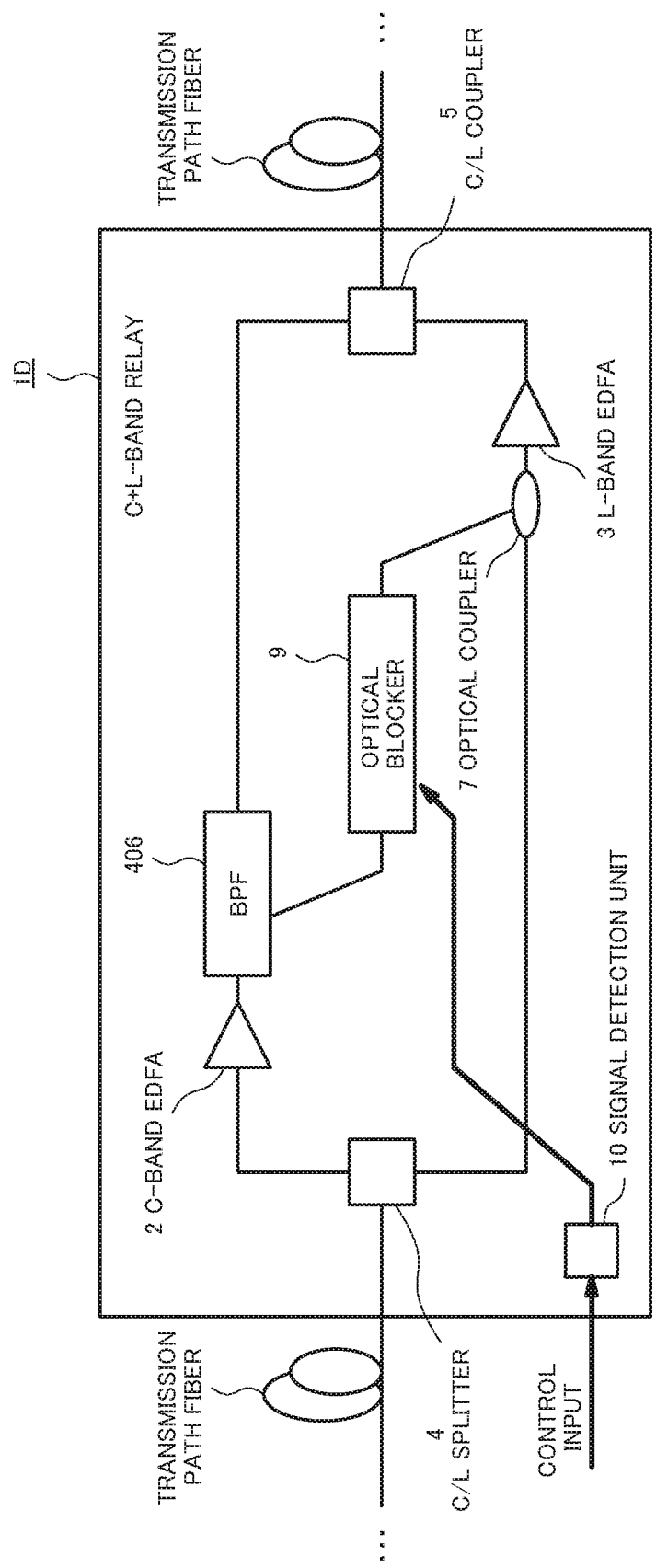
FIG. 4B is a block diagram illustrating an optical transmission system including a C+L-band relay according to a fourth example embodiment of the present invention.

Next, an optical relay, a control method of an optical relay, and an optical transmission system according to a fourth example embodiment of the present invention are described. FIG. 4B is a block diagram illustrating an optical transmission system including a C+L-band relay according to the fourth example embodiment of the present invention. The present example embodiment is a modified example of the first example embodiment and is a modified example different from the C+L-band relay 1C in FIG. 4A. An element similar to a corresponding element of the first example embodiment and the third example embodiment is assigned with the same reference number, and thereby detailed description is omitted.

(Description of a Configuration)

In an optical transmission system in FIG. 4B, a C+L-band relay 1D is inserted in a transmission path fiber. It is assumed that in a signal input from the transmission path fiber to the C+L-band relay 1D, WDM signals of both a C-band and an L-band are multiplexed.

The C+L-band relay 1D in FIG. 4B includes, similarly to the first example embodiment, a C/L splitter 4, a C-band EDFA 2 as one example of a first optical fiber amplification unit, an L-band EDFA 3 as one example of a second optical fiber amplification unit, a C/L coupler 5, and a signal detection unit 10.

Further, the C+L-band relay 1D in FIG. 4B includes an optical blocker 9, a bandpass filter 406 (BPF 406), and an optical coupler 7 as one example of an inserting means that inserts light of some or all wavelengths output from the C-band EDFA 2 into the L-band EDFA 3. In other words, the C+L-band relay 1D in FIG. 4B includes the bandpass filter 406 (BPF 406) instead of the BPF 8 and the optical coupler 6 in FIG. 1.

The BPF 406 of the present example embodiment includes a function of preforming wavelength branching, to two paths, for WDM light input from a common port. One of the two paths is a C-band main path and is output to the C/L coupler 5, and the other is output to the optical blocker 9. By using the BPF 406 including such a function, a loss in a C-band main path can be reduced, relative to the optical coupler 6 of FIG. 1. Further, both a C-band wavelength selection function and a wavelength branching function are included in the BPF 406, and therefore the number of components can be reduced.

(Description of an Operation)

An operation of the C+L-band relay 1D in FIG. 4B is described. It is assumed that in an optical signal input from a transmission path fiber to the C+L-band relay 1D, WDM signals of both a C-band and an L-band are multiplexed.

An input C+L-band signal is subjected to wavelength branching into respective bands in the C/L splitter 4. A C-band signal branched in the C/L splitter 4 is optically amplified in the C-band EDFA 2 and is subjected to wavelength branching in the BPF 406, and one of the branched signals is input to the C/L coupler 5. An L-band signal branched in the C/L splitter 4 is transmitted through the optical coupler 7, amplified in the L-band EDFA 3, and input to the C/L coupler 5. The C/L coupler 5 multiplexes amplified light of C-band wavelengths and amplified light of L-band wavelengths and outputs the multiplexed light to a transmission path fiber.

The C+L-band relay 1D according to the present example embodiment includes an optical blocker 9, a BPF 406, and an optical coupler 7, as one example of an inserting means. There is a path for inputting output light of the C-band EDFA 2 to the L-band EDFA 3 between the BPF 406 and the optical coupler 7, and the BPF 406 and the optical blocker 9 are disposed in the path. In a normal state, the optical blocker 9 is blocked and transmits a C-band signal through an L-band path only when there is control input from the signal detection unit 10.

In the C+L-band relay 1D in FIG. 4B, when a gain tilt or a gain deviation as described above occurs, the signal detection unit 10 releases the optical blocker 9, based on control input from an outside and causes C-band light to be transmitted through an L-band path leading to input of the L-band EDFA 3. The C-band light transmitted through the optical blocker 9 is multiplexed with input of the L-band EDFA 3 in the optical coupler 7.

(Description of an Advantageous Effect)

In the C+L-band relay 1D in the present example embodiment, only light of wavelengths close to an L-band of output light of the C-band EDFA 2 is multiplexed with input of the L-band EDFA 3 through a path for inputting output light of the C-band EDFA 2 to the L-band EDFA 3. Thereby, the L-band EDFA 3 amplifies an optical signal while optical power of L-band shortwave-side wavelengths is reduced. Channel power of an L-band shortwave side of the L-band EDFA 3 is reduced, and thereby signal quality degradation and an OSNR deviation due to a non-linear optical effect of an L-band to be transmitted can be reduced.

Further, according to the present example embodiment, the BPF 406 that performs wavelength branching of branching output of the C-band EDFA 2 into two paths is used. Thereby, in the C+L-band relay 1D according to the present example embodiment, a loss in a C-band main path can be reduced, relative to the optical coupler 7 in FIG. 1. Further, the BPF 406 includes a C-band wavelength selection function and a wavelength branching function, and therefore the number of components can be reduced.

Fifth Example Embodiment

Figure 4C:
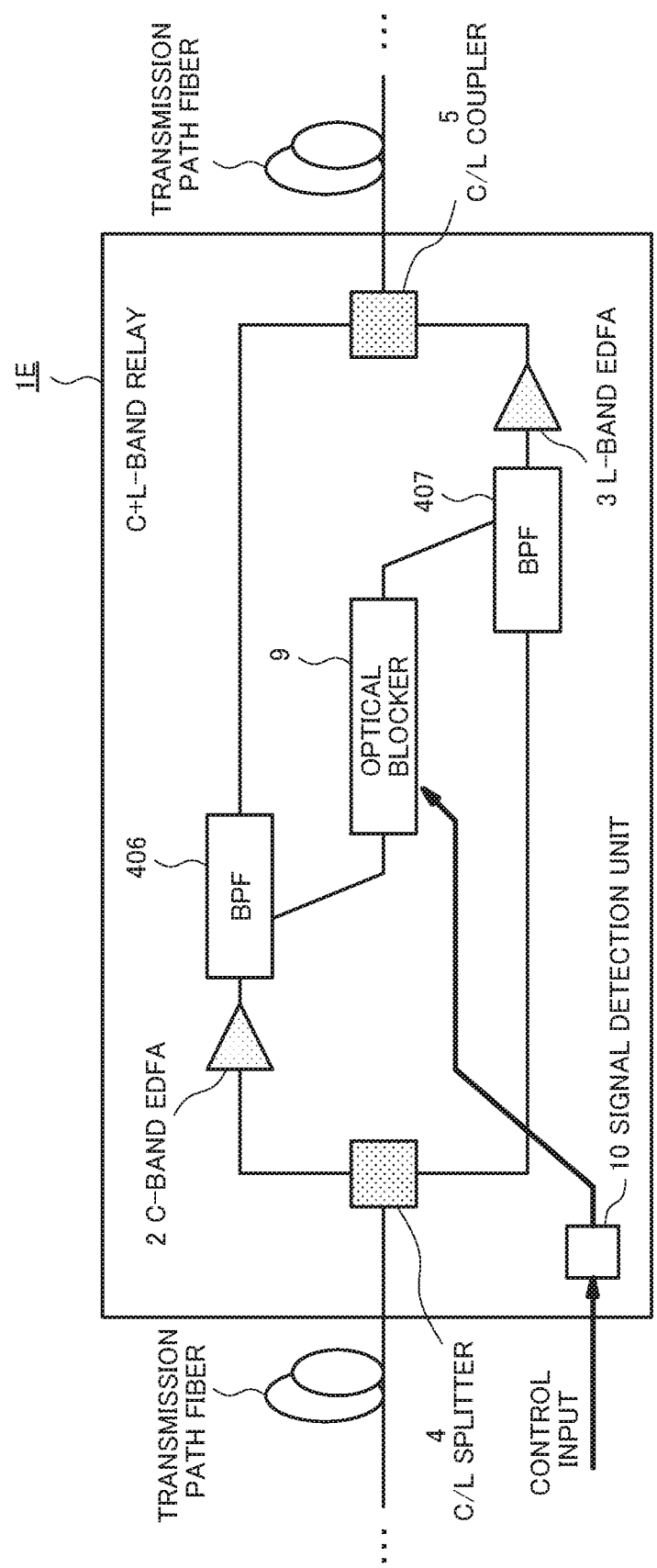
FIG. 4C is a block diagram illustrating an optical transmission system including a C+L-band relay according to a fifth example embodiment of the present invention.

Next, an optical relay, a control method of an optical relay, and an optical transmission system according to a fifth example embodiment of the present invention are described. FIG. 4C is a block diagram illustrating an optical transmission system including a C+L-band relay according to the fifth example embodiment of the present invention. The present example embodiment is a modified example of the first example embodiment and is a modified example in which the C+L-band relay 1C in FIG. 4A and the C+L-band relay 1D in FIG. 4B are combined. An element similar to a corresponding element of the first example embodiment, the third example embodiment, and the fourth example embodiment is assigned with the same reference number, and thereby detailed description is omitted.

(Description of a Configuration)

In an optical transmission system in FIG. 4C, a C+L-band relay 1E is inserted in a transmission path fiber. Similarly to the first example embodiment, it is assumed that in a signal input from the transmission path fiber to the C+L-band relay 1E, WDM signals of both a C-band and an L-band are multiplexed.

The C+L-band relay 1E in FIG. 4C includes, similarly to the first example embodiment and the like, a C/L splitter 4, a C-band EDFA 2 as one example of a first optical fiber amplification unit, an L-band EDFA 3 as one example of a second optical fiber amplification unit, a C/L coupler 5, and a signal detection unit 10.

Further, the C+L-band relay 1E in FIG. 4C includes an optical blocker 9, a bandpass filter 406 (BPF 406), and a bandpass filter 407 (BPF 407), as one example of an inserting means that inserts light of some or all wavelengths output from the L-band EDFA 3 into the C-band EDFA 2.

The BPF 406 according to the present example embodiment includes a function of preforming wavelength branching, into two paths, for WDM light input from a common port. One of the two paths is a C-band main path and is output to the C/L coupler 5, and the other is output to the optical blocker 9. By using the BPF 406 including such a function, a loss in a C-band main path can be reduced, relative to the optical coupler 6 in FIG. 1. Further, the BPF 406 includes a C-band wavelength selection function and a wavelength branching function, and therefore the number of components can be reduced.

The BPF 407 according to the present example embodiment includes a function of preforming wavelength multiplexing for light of C-band wavelengths from the optical blocker 9 and light of L-band wavelengths of an L-band main path from the C/L splitter 4. By using the BPF 407 including such a function, a loss in an L-band main path can be reduced, relative to the optical coupler 7 in FIG. 1. Further, both a C-band wavelength selection function and a multiplexing function are included in the BPF 407, and therefore the number of components can be reduced.

(Description of an Operation)

An operation of the C+L-band relay 1E in FIG. 4C is described. It is assumed that in an optical signal input from a transmission path fiber to the C+L-band relay 1E, WDM signals of both a C-band and an L-band are multiplexed.

The C+L-band relay 1E according to the present example embodiment includes the optical blocker 9, the BPF 406, and the BPF 407, as one example of an inserting means. There is a path for inputting output light of the C-band EDFA 2 to the L-band EDFA 3 between the BPF 406 and the BPF 407, and the optical blocker 9 is disposed in the path. In a normal state, the optical blocker 9 is blocked and transmits a C-band signal through an L-band path only when there is control input from the signal detection unit 10.

In the C+L-band relay 1E in FIG. 4C, when a gain tilt or a gain deviation as illustrated in FIG. 2B occurs, the signal detection unit 10 releases the optical blocker 9, based on control input from an outside and causes light to be transmitted through a C-band path leading to input of the L-band EDFA 3. In the BPF 407, only light of some wavelengths is extracted from the light transmitted through the optical blocker 9 and the extracted light is multiplexed with input of the L-band EDFA 3.

(Description of an Advantageous Effect)

In the C+L-band relay 1E according to the present example embodiment, output light of the C-band EDFA 2 is multiplexed with input of the L-band EDFA 3 through a path for inputting output light of the C-band EDFA 2 to the L-band EDFA 3. Thereby, channel power of the L-band EDFA 3 is reduced, and thereby signal quality degradation and an OSNR deviation due to a non-linear optical effect of an L-band to be transmitted can be reduced.

Further, according to the present example embodiment, the BPF 406 that performs wavelength branching of branching output of the C-band EDFA 2 into two paths is used. Thereby, in the C+L-band relay 1E according to the present example embodiment, a loss in a C-band main path can be reduced, relative to the optical coupler 7 in FIG. 1. Further, the BPF 406 includes a C-band wavelength selection function and a wavelength branching function, and therefore the number of components can be reduced.

Further, according to the present example embodiment, the BPF 407 that performs wavelength multiplexing for light of C-band wavelengths from the optical blocker 9 and light of L-band wavelengths of an L-band main path from the C/L splitter 4 is used. Thereby, in the C+L-band relay 1E according to the present example embodiment, a loss in an L-band main path can be reduced, relative to the optical coupler 7 in FIG. 1. Further, both a C-band wavelength selection function and a multiplexing function are included in the BPF 407, and therefore the number of parts can be reduced.

Sixth Example Embodiment

Figure 5:
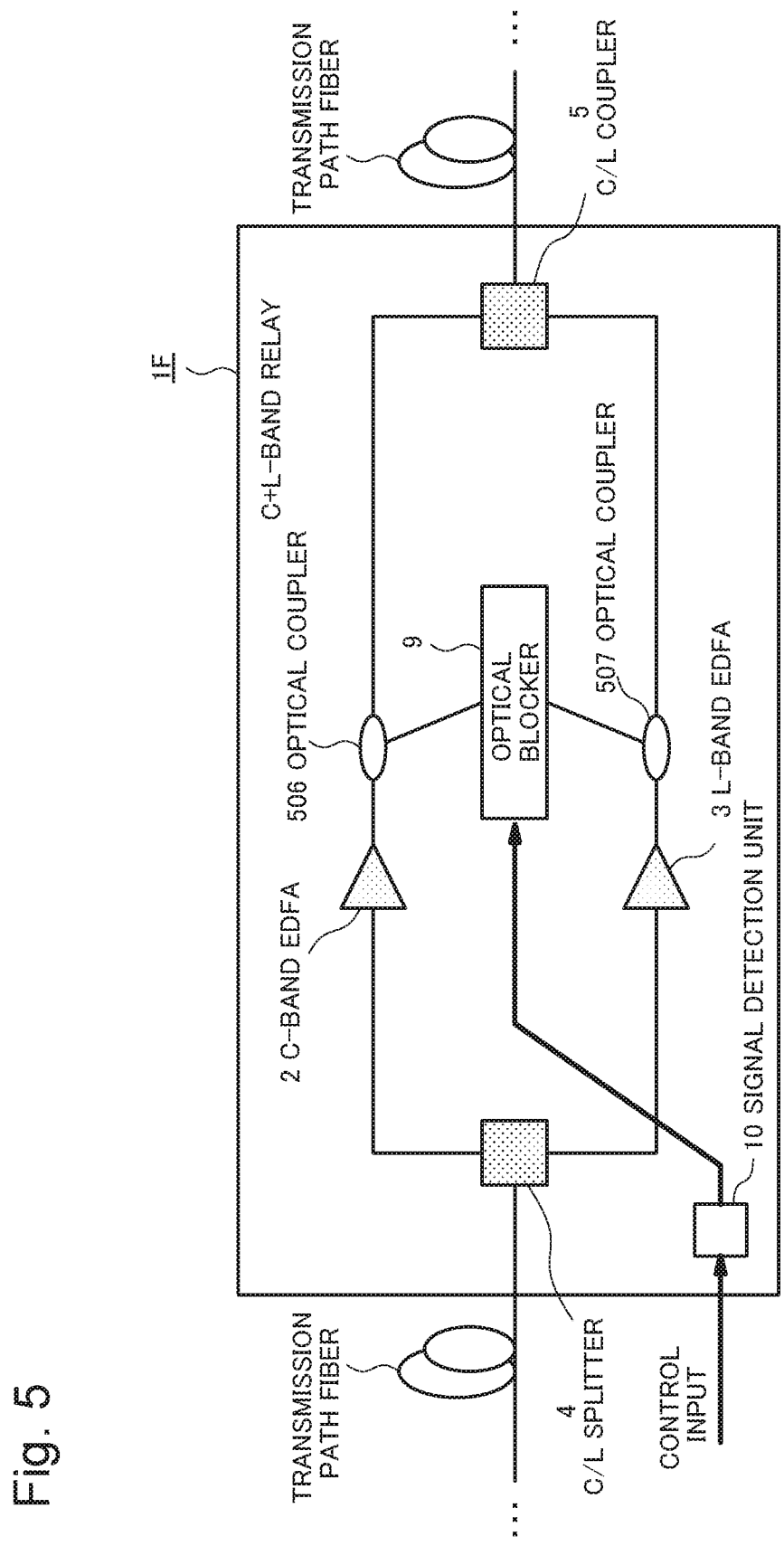
FIG. 5 is a block diagram illustrating an optical transmission system including a C+L-band relay according to a sixth example embodiment of the present invention.

Next, an optical relay, a control method of an optical relay, and an optical transmission system according to a sixth example embodiment of the present invention are described. FIG. 5 is a block diagram illustrating an optical transmission system including a C+L-band relay according to the sixth example embodiment of the present invention. According to the present example embodiment, light of C-band wavelengths is inserted from an output side of an L-band EDFA in an opposite direction or light of L-band wavelengths is inserted from an output side of a C-band EDFA in an opposite direction, and thereby a gain tilt and a gain deviation are corrected or controlled.

(Description of a Configuration)

In an optical transmission system in FIG. 5, a C+L-band relay 1F is inserted in a transmission path fiber. It is assumed that in a signal input from the transmission path fiber to the C+L-band relay 1F, WDM signals of both a C-band and an L-band are multiplexed.

The C+L-band relay 1F in FIG. 5 includes a C/L splitter 4, a C-band EDFA 2 as one example of a first optical fiber amplification unit, an L-band EDFA 3 as one example of a second optical fiber amplification unit, a C/L coupler 5, and a signal detection unit 10.

The C/L splitter 4 performs wavelength separation for an input WDM signal into a C-band/an L-band. The C-band EDFA 2 amplifies a main signal of a C-band. The L-band EDFA 3 amplifies a main signal of an L-band. The C/L coupler 5 performs wavelength multiplexing for a C-band signal amplified in the C-band EDFA 2 and an L-band signal amplified in the L-band EDFA 3. The signal detection unit 10 outputs a control signal in response to control input from an outside.

Further, the C+L-band relay 1F of FIG. 5 includes an optical blocker 9, an optical coupler 506, and an optical coupler 507, as one example of an inserting means that inserts light of some or all wavelengths output from the C-band EDFA 2 into the L-band EDFA 3. There is a path for inputting output light of the C-band EDFA 2 to the C-band EDFA 3 or for inputting output light of the L-band EDFA 3 to the C-band EDFA 2 between the optical coupler 506 and the optical coupler 507 according to the present example embodiment, and the optical blocker 9 is disposed in the path. In a normal state, the optical blocker 9 is blocked and transmits a C-band signal through an L-band path or transmits an L-band signal through a C-band path only when there is control input from the signal detection unit 10.

The optical coupler 506 includes a function of performing branching outputting for C-band light output from the C-band EDFA 2 in an optical blocker 9 direction and a function of transmitting L-band light input from an optical blocker 9 side to an output side of the C-band EDFA 2.

The optical coupler 507 includes a function of performing branching outputting for L-band light output from the L-band EDFA 3 in an optical blocker 9 direction and a function of transmitting C-band light input from an optical blocker 9 side to an output side of the L-band EDFA 3.

(Description of an Advantageous Effect)

In the C+L-band relay 1F according the present example embodiment, L-band light is input to the C-band EDFA 2 from an output side of the C-band EDFA 2 in an opposite direction, and thereby a gain tilt and a gain deviation of a C-band main path can be corrected or controlled. Further, in the C+L-band relay 1F according to the present example embodiment, C-band light is input to the L-band EDFA 3 from an output side of the L-band EDFA 3 in an opposite direction, and thereby a gain tilt and a gain deviation of an L-band main path can be corrected or controlled.

According to the present example embodiment, correction light can enter the C-band EDFA 2 and the L-band EDFA 3 from a direction opposed to a main signal transmission direction, and therefore crosstalk caused to a main signal by correction light can be reduced.

According to the present example embodiment, a case where the optical couplers 506 and 507 are used as devices that achieve demultiplexing/multiplexing of correction light has been described without limitation thereto. A configuration may be made in such a way that, as a device that achieves demultiplexing/multiplexing of correction light, for example, an optical bandpass filter and an optical circulator are used, instead of the optical couplers 506 and 507.

Further, a configuration may be made in such a way that an optical isolator or an optical bandpass filter is inserted in a path from the optical coupler 506 via the optical blocker 9 to the optical coupler 507 and thereby EDFA output of only one of the C-band EDFA 2 and the L-band EDFA 3 is corrected.

Seventh Example Embodiment

Figure 6:
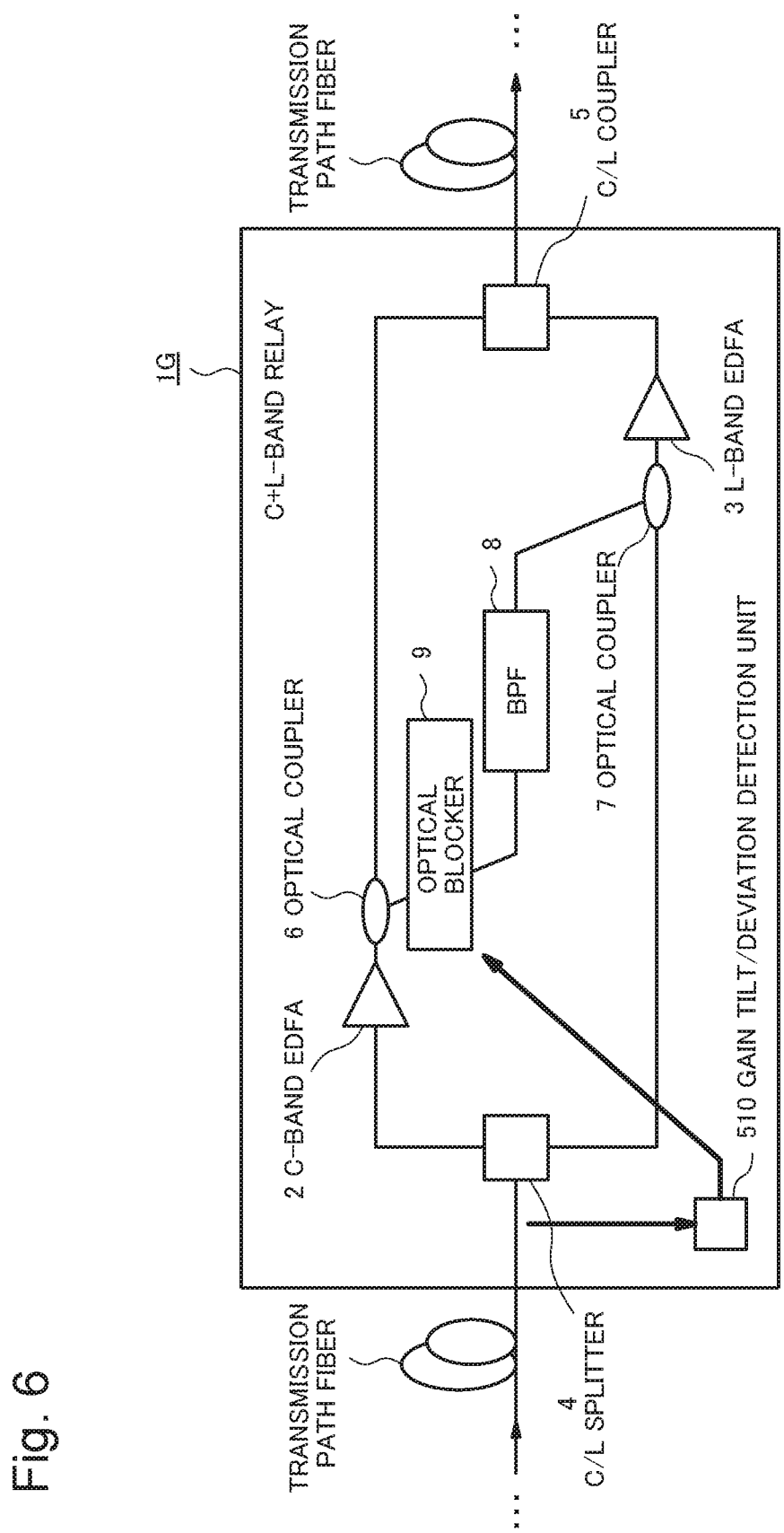
FIG. 6 is a block diagram illustrating an optical transmission system including a C+L-band relay according to a seventh example embodiment of the present invention.

Next, an optical relay, a control method of an optical relay, and an optical transmission system according to a seventh example embodiment of the present invention are described. FIG. 6 is a block diagram illustrating an optical transmission system including a C+L-band relay according to the seventh example embodiment of the present invention. According to the first to sixth example embodiments described above, it has been described that a control signal for controlling blocking or transmission of the optical blocker 9 is provided to the optical blocker 9 by the signal detection unit 10, based on control input from an outside, without limitation thereto. The present example embodiment is a modified example of the C+L-band relay 1A in FIG. 1. An element similar to a corresponding element of the first example embodiment is assigned with the same reference number, and thereby detailed description is omitted.

(Description of a Configuration)

In an optical transmission system in FIG. 6, a C+L-band relay 1G is inserted in a transmission path fiber. It is assumed that in a signal input from the transmission path fiber to the C+L-band relay 1G, WDM signals of both a C-band and an L-band are multiplexed.

The C+L-band relay 1G in FIG. 6 includes, similarly to the first example embodiment, a C/L splitter 4, a C-band EDFA 2 as one example of a first optical fiber amplification unit, an L-band EDFA 3 as one example of a second optical fiber amplification unit, and a C/L coupler 5. Further, the C+L-band relay 1G in FIG. 6 includes, similarly to the first example embodiment, an optical blocker 9, a bandpass filter 8 (BPF 8), an optical coupler 6, and an optical coupler 7, as one example of an inserting means that inserts light of some or all wavelengths output from the C-band EDFA 2 into the L-band EDFA 3.

Further, the C+L-band relay 1G in FIG. 6 includes a gain tilt/deviation detection unit 510 that controls the optical blocker 9. The gain tilt/deviation detection unit 510 extracts WDM wavelengths from a path of the C+L-band relay 1G and detects a state of a gain tilt or a gain deviation. The gain tilt/deviation detection unit 510 controls transmission or blocking of the optical blocker 9, based on a detection result.

(Description of an Advantageous Effect)

According to the present example embedment, similarly to the first example embodiment, channel power of an L-band shortwave side of the L-band EDFA 3 is reduced, and thereby signal quality degradation and an OSNR deviation due to a non-linear optical effect of an L-band to be transmitted can be reduced.

Further, according to the present example embodiment, the gain tilt/deviation detection unit 510 extracts WDM wavelengths from a path of the C+L-band relay 1G, detects a state of a gain tilt or a gain deviation, and controls transmission or blocking of the optical blocker 9. Therefore, the C+L-band relay 1G can autonomously correct a gain tilt and a gain deviation.

In FIG. 6, a configuration is made in such a way that WDM wavelengths are extracted from a path of the C+L-band relay 1G of an anterior stage of the C/L splitter 4, but the present example embodiment is not limited thereto. A configuration may be made in such a way that, for example, WDM wavelengths are extracted from a path after C-band/L-band branching of the C+L-band relay 1G or from an output-posterior stage of the C/L coupler 5.

Eighth Example Embodiment

Figure 7:
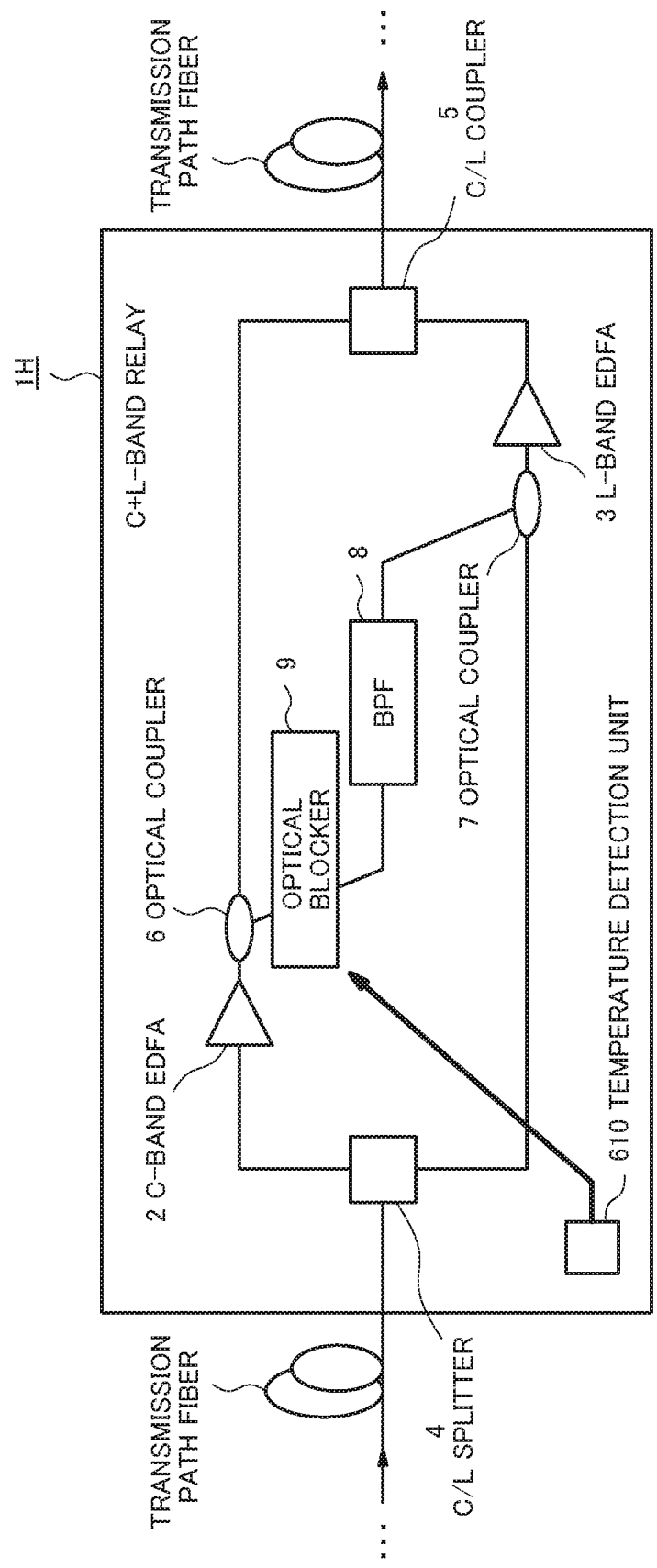
FIG. 7 is a block diagram illustrating an optical transmission system including a C+L-band relay according to an eighth example embodiment of the present invention.

Next, an optical relay, a control method of an optical relay, and an optical transmission system according to an eighth example embodiment of the present invention are described. FIG. 7 is a block diagram illustrating an optical transmission system including a C+L-band relay according to the eighth example embodiment of the present invention. According to the seventh example embodiment described above, it has been described, without limitation to the following, that a control signal for controlling blocking or transmission of the optical blocker 9 is provided by detecting, by using the gain tilt/deviation detection unit 510, a state of a gain tilt or a gain deviation from a path of the C+L-band relay 1G and the like. The present example embodiment is another modified example of the C+L-band relay 1A in FIG. 1 and the C+L-band relay 1G in FIG. 6. An element similar to a corresponding element of the first example embodiment and the seventh example embodiment is assigned with the same reference number, and thereby detailed description is omitted.

(Description of a Configuration)

In an optical transmission system in FIG. 7, a C+L-band relay 1H is inserted in a transmission path fiber. It is assumed that in a signal input from the transmission path fiber to the C+L-band relay 1H, WDM signals of both a C-band and an L-band are multiplexed.

The C+L-band relay 1H in FIG. 7 includes, similarly to the first example embodiment and the seventh example embodiment, a C/L splitter 4, a C-band EDFA 2 as one example of a first optical fiber amplification unit, an L-band EDFA 3 as one example of a second optical fiber amplification unit, and a C/L coupler 5. Further, the C+L-band relay 1H in FIG. 7 includes, similarly to the first example embodiment and the seventh example embodiment, an optical blocker 9, a bandpass filter 8 (BPF 8), an optical coupler 6, and an optical coupler 7, as one example of an inserting means that inserts light of some or all wavelengths output from the C-band EDFA 2 into the L-band EDFA 3.

Further, the C+L-band relay 1H in FIG. 7 includes a temperature detection unit 610 that controls the optical blocker 9. The temperature detection unit 610 detects temperature information of the C+L-band relay 1H or a configuring unit thereof. The temperature detection unit 610 controls transmission or blocking of the optical blocker 9, based on a detection result.

(Description of an Advantageous Effect)

According to the present example embedment, similarly to the first example embodiment and the seventh example embodiment, channel power of an L-band shortwave side of the L-band EDFA 3 is reduced, and thereby signal quality degradation and an OSNR deviation due to a non-linear optical effect of an L-band to be transmitted can be reduced.

Further, according to the present example embodiment, the temperature detection unit 610 detects temperature information of the C+L-band relay 1H or a configuring unit thereof and controls transmission or blocking of the optical blocker 9. Therefore, the C+L-band relay 1H can autonomously correct a gain tilt and a gain deviation, based on temperature information.

Ninth Example Embodiment

Figure 8A:
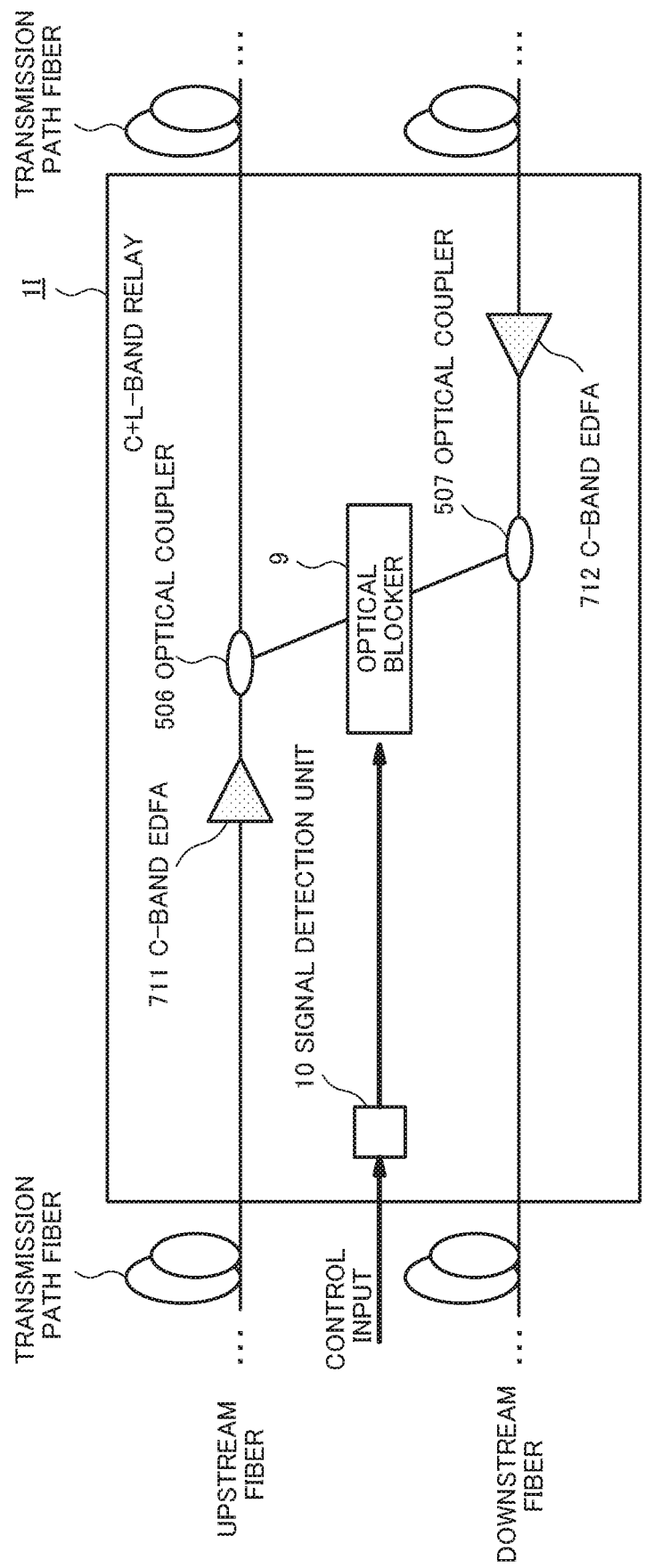
FIG. 8A is a block diagram illustrating an optical transmission system including a C+L-band relay according to a ninth example embodiment of the present invention.

Next, an optical relay, a control method of an optical relay, and an optical transmission system according to a ninth example embodiment of the present invention are described. FIG. 8A is a block diagram illustrating an optical transmission system including a C+L-band relay according to the ninth example embodiment of the present invention. According to the example embodiments described above, applications to a C+L-band relay including a signal path using the C/L splitter 4 and the C/L coupler 5 have been described, but in the present invention, an extension that is not limited thereto, is conceivable. In other words, it is conceivable that a configuration that corrects or controls a gain tilt and a gain deviation of EDFAs that use the same wavelength band is made.

(Description of a Configuration)

In an optical transmission system in FIG. 8A, a C+L-band relay 1I is inserted in parallel transmission path fibers of two lines. Specifically, in the optical transmission system in FIG. 8A, the C+L-band relay 1I is inserted between parallel transmission path fibers of two lines being an upstream fiber and a downstream fiber having directions opposed to each other. It is assumed that in a signal input from each transmission path fiber to the C+L-band relay 1I, WDM signals of both a C-band and an L-band are multiplexed.

The C+L-band relay 1I in FIG. 8A includes a C-band EDFA 711 as one example of a first optical fiber amplification unit, a C-band EDFA 712 as one example of a second optical fiber amplification unit, and a signal detection unit 10.

Further, the C+L-band relay 1I in FIG. 8A includes an optical blocker 9, an optical coupler 506, and an optical coupler 507, as one example of an inserting means that inserts light of some or all wavelengths output from the C-band EDFA 711 into the C-band EDFA 712 or inserts light of some or all wavelengths output from the C-band EDFA 712 into the C-band EDFA 711. There is a path for inputting output light of the C-band EDFA 711 to the C-band EDFA 712 or for inputting output light of the C-band EDFA 712 to the C-band EDFA 711 between the optical coupler 506 and the optical coupler 507 according to the present example embodiment, and the optical blocker 9 is disposed in the path. In a normal state, the optical blocker 9 is blocked and transmits a C-band signal from the C-band EDFA 711 through a path leading to a main path of the C-band EDFA 712 or transmits a C-band signal from the C-band EDFA 712 through a path leading to a main path of the C-band EDFA 711 only when there is control input from the signal detection unit 10.

The optical coupler 506 includes a function of performing branching outputting for C-band light output from the C-band EDFA 711 in an optical blocker 9 direction and includes a function of transmitting C-band light input from an optical blocker 9 side to an output side of the C-band EDFA 711.

The optical coupler 507 includes a function of performing branching outputting for C-band light output from the C-band EDFA 712 in an optical blocker 9 direction and includes a function of transmitting C-band light input from an optical blocker 9 side to an output side of the C-band EDFA 712.

(Description of an Advantageous Effect)

In the C+L-band relay 1I according to the present example embodiment, C-band light is input to the C-band EDFA 711 from an output side of the C-band EDFA 711 in an opposite direction, and thereby a gain tilt and a gain deviation of a main path of the C-band EDFA 711 can be corrected or controlled. Further, in the C+L-band relay 1I according to the present example embodiment, C-band light is input to the C-band EDFA 712 from an output side of the C-band EDFA 712 in an opposite direction, and thereby a gain tilt and a gain deviation of a main path of the C-band EDFA 712 can be corrected or controlled.

According to the present example embodiment, correction light can enter the C-band EDFA 711 and the L-band EDFA 712 from a direction opposed to a main signal transmission direction, and therefore crosstalk caused to a main signal by correction light can be reduced.

According to the present example embodiment, a case where the optical couplers 506 and 507 are used as a device that achieves demultiplexing/multiplexing of correction light has been described without limitation thereto. A configuration may be made in such a way that, as a device that achieves demultiplexing/multiplexing of correction light, for example, an optical bandpass filter and an optical circulator are used, instead of the optical couplers 506 and 507.

Further, by inserting an optical isolator or an optical bandpass filter in a path from the optical coupler 506 via the optical blocker 9 to the optical coupler 507, a configuration may be made in such a way that EDFA output of only one of the C-band EDFA 711 and the C-band EDFA 712 is corrected.

Tenth Example Embodiment

Figure 8B:
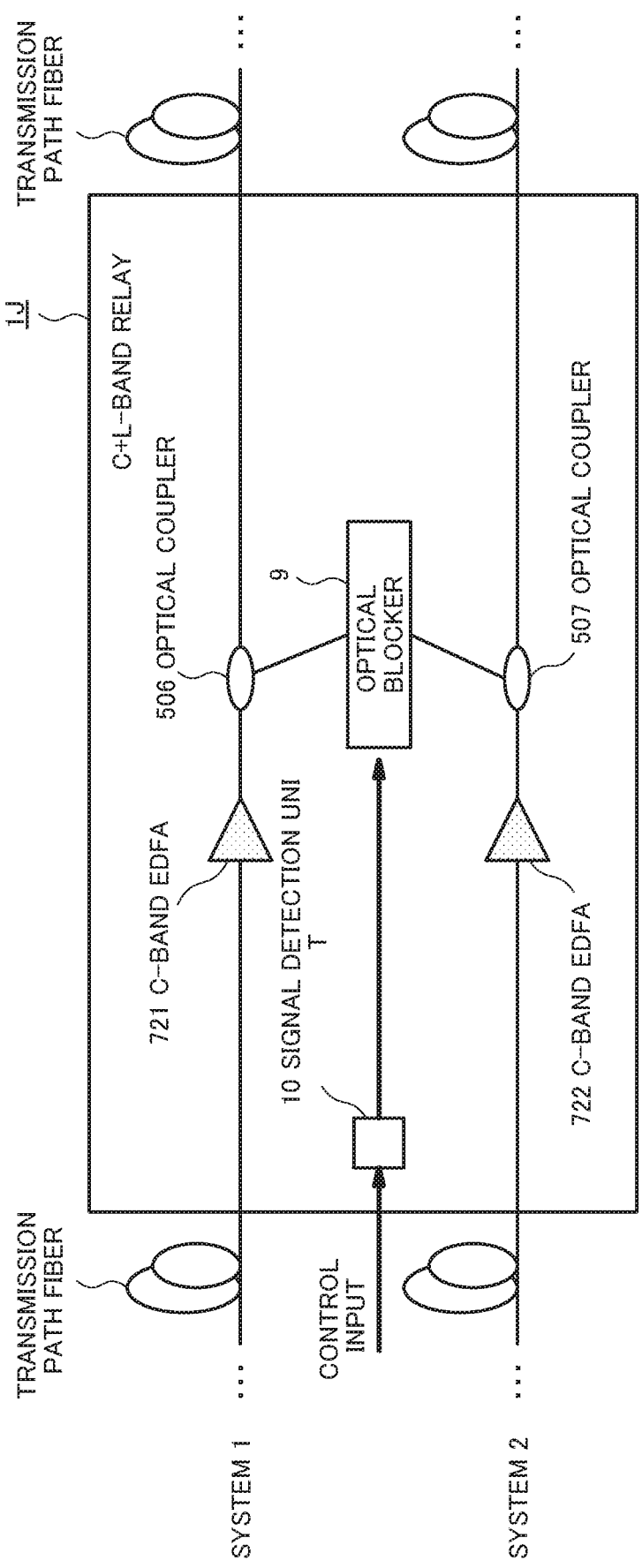
FIG. 8B is a block diagram illustrating an optical transmission system including a C+L-band relay according to a tenth example embodiment of the present invention.

Next, an optical relay, a control method of an optical relay, and an optical transmission system according to a tenth example embodiment of the present invention are described. FIG. 8B is a block diagram illustrating an optical transmission system including a C+L-band relay according to the tenth example embodiment of the present invention. The present example embodiment is achieved by applying the present invention to an aspect similar to the optical relay according to the ninth example embodiment. According to the present embodiment, it is assumed that correction light is input from an EDFA of another transmission system within the same relay.

(Description of a Configuration)

In an optical transmission system in FIG. 8B, a C+L-band relay 1J is inserted in parallel transmission path fibers of two lines. Specifically, in the optical transmission system in FIG. 8B, a configuration is made in such a way that a plurality of transmission systems pass through the same relay, and the C+L-band relay 1J is inserted in parallel transmission path fibers of two lines of a system 1 and a system 2. It is assumed that in a signal input from each transmission path fiber to the C+L-band relay 1J, WDM signals of both a C-band and an L-band are multiplexed.

The C+L-band relay 1J in FIG. 8B includes a C-band EDFA 721 as one example of a first optical fiber amplification unit, a C-band EDFA 722 as one example of a second optical fiber amplification unit, and a signal detection unit 10.

Further, the C+L-band relay 1J in FIG. 8B includes an optical blocker 9, an optical coupler 506, and an optical coupler 507, as one example of an inserting means that inserts light of some or all wavelengths output from the C-band EDFA 721 into the C-band EDFA 722 or inserts light of some or all wavelengths output from the C-band EDFA 722 into the C-band EDFA 721. There is a path for inputting output light of the C-band EDFA 721 to the C-band EDFA 722 or for inputting output light of the C-band EDFA 722 to the C-band EDFA 721 between the optical coupler 506 and the optical coupler 507 according to the present example embodiment, and the optical blocker 9 is disposed in the path. In a normal state, the optical blocker 9 is blocked and transmits a C-band signal from the C-band EDFA 721 through a path leading to a main path of the C-band EDFA 722 or transmits a C-band signal from the C-band EDFA 722 through a path leading to a main path of the C-band EDFA 721 only when there is control input from the signal detection unit 10.

The optical coupler 506 includes a function of performing branching outputting for C-band light output from the C-band EDFA 721 in an optical blocker 9 direction and includes a function of transmitting C-band light input from an optical blocker 9 side to an output side of the C-band EDFA 721.

The optical coupler 507 includes a function of performing branching outputting for C-band light output from the C-band EDFA 722 in an optical blocker 9 direction and includes a function of transmitting C-band light input from an optical blocker 9 side to an output side of the C-band EDFA 722.

(Description of an Advantageous Effect)

In the C+L-band relay 1J according to the present example embedment, C-band light is input to the C-band EDFA 721 from an output side of the C-band EDFA 721 in an opposite direction, and thereby a gain tilt and a gain deviation of a main path of the C-band EDFA 721 can be corrected or controlled. Further, in the C+L-band relay 1J according to the present example embedment, C-band light is input to the C-band EDFA 722 from an output side of the C-band EDFA 722 in an opposite direction, and thereby a gain tilt and a gain deviation of a main path of the C-band EDFA 722 can be corrected or controlled.

According to the present example embodiment, correction light can enter the C-band EDFA 721 and the C-band EDFA 722 from a direction opposed to a main signal transmission direction, and therefore crosstalk caused to a main signal by correction light can be reduced.

According to the present example embodiment, a gain tilt and a gain deviation of a main path can be corrected or controlled between paths of two lines of the system 1 and the system 2 relayed by the C+L-band relay 1J.

According to the present example embodiment, a case where the optical couplers 506 and 507 are used as a device that achieves demultiplexing/multiplexing of correction light has been described without limitation thereto. A configuration may be made in such a way that, as a device that achieves demultiplexing/multiplexing of correction light, for example, an optical bandpass filter and an optical circulator are used, instead of the optical couplers 506 and 507.

Further, by inserting an optical isolator or an optical bandpass filter in a path from the optical coupler 506 via optical blocker 9 to the optical coupler 507, a configuration may be made in such a way that EDFA output of only one of the C-band EDFA 721 and the C-band EDFA 722 is corrected.

Other Example Embodiments

While preferred example embodiments of the present invention have been described with reference to the accompanying drawings, the present invention is not limited to these example embodiments. When an optical blocker 9 of each of the example embodiments described above such as the first example embodiment and the like is configured in such a way as to be able to adjust an optical attenuation amount, a gain deviation and a gain tilt can be controlled with a level of C-band light to be transmitted on an L-band side.

A configuration may be achieved by using a wavelength selective switch (WSS), instead of a combination of an optical blocker 9 and a BPF according to each of the example embodiments described above.

The example embodiment of the present invention can be applied not only to correction of a gain tilt and a gain deviation caused by accumulation of losses due to repairing and the like of a transmission path fiber in the entire transmission system resulting from a long-term operation but also correction of a gain tilt and a gain deviation caused by another factor. For example, an increase/decrease in a signal level and an amplified spontaneous emission noise (ASE noise) level of a main signal path due to a level increase/decrease in a peripheral wavelength, wavelength transition of power due to a Raman effect, a change in a gain tilt due to a gain change of an optical amplification medium, or the like are conceivable. The example embodiment of the present invention can be applied to all phenomena in which correction light induces a power change in a main signal wavelength of a main path in an optical amplification medium.

While according to the first example embodiment to the eighth example embodiment described above, a C+L-band optical relay including a C-band EDFA and an L-band EDFA has been described as an example, the example embodiment of the present invention can be applied to an optical relay that uses an optical amplification medium doped with a fluorescent material of a rare-earth element and separates, amplifies, and re-multiplexes a plurality of any wavelength bands, regardless of wavelength disposition being a subject of wavelength band separation and an amplification medium.

Further, each of the example embodiments described above can be used in combination with any of the other example embodiments described above. Further, all the example embodiments described above can be used in combination with a technique, known conventionally, of correcting or controlling a gain tilt and a gain deviation and input/output power.

The whole or part of the example embodiments disclosed above can be described as, but not limited to, the following supplementary notes.

(Supplementary Note 1) An optical relay that is a C+L-band relay inserted between a first transmission path fiber and a second transmission path fiber, the optical relay including: a first optical fiber amplification unit that is inserted in a first line and amplifies either a C-band signal or an L-band signal; a second optical fiber amplification unit that is inserted in a second line and amplifies either a C-band signal or an L-band signal; and an inserting means that inserts light of some or all wavelengths output from the first optical fiber amplification unit into the second optical fiber amplification unit or inserts light of some or all wavelengths output from the second optical fiber amplification unit into the first optical fiber amplification unit.

(Supplementary Note 2) The optical relay according to supplementary note 1, wherein the inserting means includes an optical blocker disposed in a path for inserting light of some or all wavelengths output from the first optical fiber amplification unit into the second optical fiber amplification unit or in a path for inserting light of some or all wavelengths output from the second optical fiber amplification unit into the first optical fiber amplification unit.

(Supplementary Note 3) The optical relay according to supplementary note 2, wherein the optical blocker transmits or blocks an input optical signal, according to a control signal.

(Supplementary Note 4) The optical relay according to supplementary note 3, wherein the control signal is provided from an outside.

(Supplementary Note 5) The optical relay according to supplementary note 3, further including a detection means that detects a wavelength of an optical signal of the first line or the second line and provides the control signal for the optical blocker, based on a detection result.

(Supplementary Note 6) The optical relay according to supplementary note 3, further including a detection means that detects temperature information and provides the control signal for the optical blocker, based on a detection result.

(Supplementary Note 7) The optical relay according to any one of supplementary notes 2 to 6, wherein the inserting means includes a bandpass filter disposed in a path for inserting light of some or all wavelengths output from the first optical fiber amplification unit into the second optical fiber amplification unit or in a path for inserting light of some or all wavelengths output from the second optical fiber amplification unit into the first optical fiber amplification unit.

(Supplementary Note 8) The optical relay according to supplementary note 7, wherein the bandpass filter is disposed in the first line being a path for inserting light of some or all wavelengths output from the first optical fiber amplification unit into the second optical fiber amplification unit.

(Supplementary Note 9) The optical relay according to supplementary note 7, wherein the bandpass filter is disposed in the second line being a path for inserting light of some or all wavelengths output from the second optical fiber amplification unit into the first optical fiber amplification unit.

(Supplementary Note 10) The optical relay according to supplementary note 7, wherein the bandpass filter includes a first bandpass filter and a second bandpass filter, the first bandpass filter is disposed in the first line being a path for inserting light of some or all wavelengths output from the first optical fiber amplification unit into the second optical fiber amplification unit, and the second bandpass filter is disposed in the first line being a path for inserting light of some or all wavelengths output from the first optical fiber amplification unit into the second optical fiber amplification unit.

(Supplementary Note 11) The optical relay according to any one of supplementary notes 1 to 10, wherein an increase/decrease in output power or an optical signal to noise ratio (OSNR) of an entire bandwidth of a band of the second optical fiber amplification unit is controlled based on an optical intensity, a wavelength range, or a combination of an optical intensity and a wavelength range of light of some or all wavelengths output from the first optical fiber amplification unit and inserted into the second optical fiber amplification unit, or an increase/decrease in output power or an OSNR of an entire bandwidth of a band of the first optical fiber amplification unit is controlled based on an optical intensity, a wavelength range, or a combination of an optical intensity and a wavelength range of light of some or all wavelengths output from the second optical fiber amplification unit and inserted into the first optical fiber amplification unit, and thereby main signal quality is balanced between the C-band signal and the L-band signal.

(Supplementary Note 12) The optical relay according to any one of supplementary notes 1 to 11, further including a C/L splitter that divides an optical signal from the first transmission path fiber into the first line and the second line; and a C/L coupler that couples optical signals from the first line and the second line.

(Supplementary Note 13) An optical transmission system including: the optical relay according to any one of supplementary notes 1 to 12; a first transmission path fiber; and a second transmission path fiber.

(Supplementary Note 14) A control method of an optical relay that is a control method of a C+L-band relay inserted between a first transmission path fiber and a second transmission path fiber, wherein the optical relay includes a first optical fiber amplification unit that is inserted in a first line and amplifies either a C-band signal or an L-band signal and a second optical fiber amplification unit that is inserted in a second line and amplifies either a C-band signal or an L-band signal, the method including inserting light of some or all wavelengths output from the first optical fiber amplification unit into the second optical fiber amplification unit or inserting light of some or all wavelengths output from the second optical fiber amplification unit into the first optical fiber amplification unit.

(Supplementary Note 15) The control method of an optical relay according to supplementary note 14, wherein the optical relay includes an optical blocker disposed in a path for inserting light of some or all wavelengths output from the first optical fiber amplification unit into the second optical fiber amplification unit or in a path for inserting light of some or all wavelengths output from the second optical fiber amplification unit into the first optical fiber amplification unit.

(Supplementary Note 16) The control method of an optical relay according to supplementary note 15, wherein the optical blocker transmits or blocks an input optical signal, according to a control signal.

(Supplementary Note 17) The control method of an optical relay according to supplementary note 16, wherein the control signal is provided from an outside.

(Supplementary Note 18) The control method of an optical relay according to supplementary note 16, wherein the optical relay includes a detection means that detects a wavelength of an optical signal of the first line or the second line and provides the control signal for the optical blocker, based on a detection result.

(Supplementary Note 19) The control method of an optical relay according to supplementary note 16, wherein the optical relay includes a detection means that detects temperature information of the optical relay or a configuring unit of the optical relay and provides the control signal for the optical blocker, based on a detection result.

(Supplementary Note 20) The control method of an optical relay according to any one of supplementary notes 14 to 19, wherein the optical relay controls an increase/decrease in output power or an optical signal to noise ratio (OSNR) of an entire bandwidth of a band of the second optical fiber amplification unit, based on an optical intensity, a wavelength range, or a combination of an optical intensity and a wavelength range of light of some or all wavelengths output from the first optical fiber amplification unit and inserted into the second optical fiber amplification unit, or controls an increase/decrease in output power or an OSNR of an entire bandwidth of a band of the first optical fiber amplification unit, based on an optical intensity, a wavelength range, or a combination of an optical intensity and a wavelength range of light of some or all wavelengths output from the second optical fiber amplification unit and inserted into the first optical fiber amplification unit, and thereby balances main signal quality between the C-band signal and the L-band signal.

The present invention has been described by using the above-described example embodiments as exemplary cases.

However, the present invention is not limited to the above-described example embodiments. In other words, the present invention can be applied with various aspects that can be understood by those of ordinary skill in the art without departing from the scope of the present invention.

This application is based upon and claims the benefit of priority from Japanese patent application No. 2017-94506, filed on May 11, 2017, the disclosure of which is incorporated herein in its entirety by reference.

REFERENCE SIGNS LIST 1A to 1J C+L-band relay
2, 711, 712, 721, 722 C-band EDFA
3 L-band EDFA
4 C/L splitter
5 C/L coupler
6, 7, 306, 307, 506, 507 Optical coupler
8, 406, 407 BPF
9 Optical blocker
10 Signal detection unit
510 Gain tilt/deviation detection unit
610 Temperature detection unit

What is claimed is:

1. An optical relay that is a C+L-band relay inserted between a first transmission path fiber and a second transmission path fiber, the optical relay comprising:
    a first optical fiber amplification unit that is inserted in a first line and amplifies either a C-band signal or an L-band signal;
    a second optical fiber amplification unit that is inserted in a second line and amplifies either a C-band signal or an L-band signal; and
    an inserting unit that inserts light of some or all wavelengths output from the first optical fiber amplification unit into the second optical fiber amplification unit or inserts light of some or all wavelengths output from the second optical fiber amplification unit into the first optical fiber amplification unit.

2. The optical relay according to claim 1, wherein the inserting unit includes an optical blocker disposed in a path for inserting light of some or all wavelengths output from the first optical fiber amplification unit into the second optical fiber amplification unit or in a path for inserting light of some or all wavelengths output from the second optical fiber amplification unit into the first optical fiber amplification unit.

3. The optical relay according to claim 2, wherein the optical blocker transmits or blocks an input optical signal, according to a control signal.

4. The optical relay according to claim 3, wherein the control signal is provided from an outside.

5. The optical relay according to claim 3, further including a detection unit that detects a wavelength of an optical signal of the first line or the second line and provides the control signal for the optical blocker, based on a detection result.

6. The optical relay according to claim 3, further including a detection unit that detects temperature information and provides the control signal for the optical blocker, based on a detection result.

7. The optical relay according to claim 2, wherein the inserting unit includes a bandpass filter disposed in a path for inserting light of some or all wavelengths output from the first optical fiber amplification unit into the second optical fiber amplification unit or in a path for inserting light of some or all wavelengths output from the second optical fiber amplification unit into the first optical fiber amplification unit.

8. The optical relay according to claim 7, wherein the bandpass filter is disposed in the first line where the position is a path for inserting light of some or all wavelengths output from the first optical fiber amplification unit into the second optical fiber amplification unit.

9. The optical relay according to claim 7, wherein the bandpass filter is disposed in the second line where the position is a path for inserting light of some or all wavelengths output from the second optical fiber amplification unit into the first optical fiber amplification unit.

10. The optical relay according to claim 7, wherein the bandpass filter includes a first bandpass filter and a second bandpass filter, the first bandpass filter is disposed in the first line being a path for inserting light of some or all wavelengths output from the first optical fiber amplification unit into the second optical fiber amplification unit, and the second bandpass filter is disposed in the first line being a path for inserting light of some or all wavelengths output from the first optical fiber amplification unit into the second optical fiber amplification unit.

11. The optical relay according to claim 1, wherein an increase/decrease in output power or an optical signal to noise ratio (OSNR) of an entire bandwidth of a band of the second optical fiber amplification unit is controlled based on an optical intensity, a wavelength range, or a combination of an optical intensity and a wavelength range of light of some or all wavelengths output from the first optical fiber amplification unit and inserted into the second optical fiber amplification unit, or an increase/decrease in output power or an OSNR of an entire bandwidth of a band of the first optical fiber amplification unit is controlled based on an optical intensity, a wavelength range, or a combination of an optical intensity and a wavelength range of light of some or all wavelengths output from the second optical fiber amplification unit and inserted into the first optical fiber amplification unit, and thereby main signal quality is balanced between the C-band signal and the L-band signal.

12. The optical relay according to claim 1, further comprising:
    a C/L splitter that divides an optical signal from the first transmission path fiber into the first line and the second line; and
    a C/L coupler that couples optical signals from the first line and the second line.

13. An optical transmission system including: the optical relay according to claim 1; a first transmission path fiber; and a second transmission path fiber.

14. A control method of an optical relay that is a control method of a C+L-band relay inserted between a first transmission path fiber and a second transmission path fiber, wherein an optical relay includes
    a first optical fiber amplification unit that is inserted in a first line and amplifies either a C-band signal or an L-band signal and a second optical fiber amplification unit that is inserted in a second line and amplifies either a C-band signal or an L-band signal,
    the method comprising:
    inserting light of some or all wavelengths output from the first optical fiber amplification unit into the second optical fiber amplification unit or
    inserting light of some or all wavelengths output from the second optical fiber amplification unit into the first optical fiber amplification unit.

15. The control method of an optical relay according to claim 14, wherein the optical relay includes an optical blocker disposed in a path for inserting light of some or all wavelengths output from the first optical fiber amplification unit into the second optical fiber amplification unit or in a path for inserting light of some or all wavelengths output from the second optical fiber amplification unit into the first optical fiber amplification unit.

16. The control method of an optical relay according to claim 15, wherein the optical blocker transmits or blocks an input optical signal, according to a control signal.

17. The control method of an optical relay according to claim 16, wherein the control signal is provided from an outside.

18. The control method of an optical relay according to claim 16, wherein the optical relay includes a detection unit that detects a wavelength of an optical signal of the first line or the second line and provides the control signal for the optical blocker, based on a detection result.

19. The control method of an optical relay according to claim 16, wherein the optical relay includes a detection unit that detects temperature information of the optical relay or a configuring unit of the optical relay and provides the control signal for the optical blocker, based on a detection result.

20. The control method of an optical relay according to claim 14, wherein the optical relay controls an increase/decrease in output power or an optical signal to noise ratio (OSNR) of an entire bandwidth of a band of the second optical fiber amplification unit, based on an optical intensity, a wavelength range, or a combination of an optical intensity and a wavelength range of light of some or all wavelengths output from the first optical fiber amplification unit and inserted into the second optical fiber amplification unit, or controls an increase/decrease in output power or an OSNR of an entire bandwidth of a band of the first optical fiber amplification unit, based on an optical intensity, a wavelength range, or a combination of an optical intensity and a wavelength range of light of some or all wavelengths output from the second optical fiber amplification unit and inserted into the first optical fiber amplification unit, and thereby balances main signal quality between the C-band signal and the L-band signal.

* * * * *